(12) United States Patent
Pattai et al.

(10) Patent No.: US 12,458,771 B2
(45) Date of Patent: Nov. 4, 2025

(54) PHYSIOLOGICAL LUNG SIMULATOR

(71) Applicant: Loewenstein Medical Technology S.A., Luxembourg (LU)

(72) Inventors: Steffen Pattai, Koblenz (DE); Mikaela Maria Dombrowa, Weil der Stadt (DE); Alexander Best, Seelbach (DE)

(73) Assignee: LOEWENSTEIN MEDICAL TECHNOLOGY S.A., Luxembourg (LU)

( * ) Notice: Subject to any disclaimer, the term of this patent is extended or adjusted under 35 U.S.C. 154(b) by 911 days.

(21) Appl. No.: 17/654,100

(22) Filed: Mar. 9, 2022

(65) Prior Publication Data

US 2022/0288342 A1 Sep. 15, 2022

(30) Foreign Application Priority Data

Mar. 10, 2021 (DE) .......................... 102021001279.8

(51) Int. Cl.
| | |
|---|---|
| *A61M 16/12* | (2006.01) |
| *A61M 16/00* | (2006.01) |
| *A61M 16/01* | (2006.01) |
| *A61M 16/10* | (2006.01) |
| *A61M 16/20* | (2006.01) |

(Continued)

(52) U.S. Cl.
CPC ........ *A61M 16/12* (2013.01); *A61M 16/1005* (2014.02); *G09B 23/288* (2013.01); *G09B 23/32* (2013.01); *A61M 2016/0027* (2013.01); *A61M 16/0057* (2013.01); *A61M 16/0066* (2013.01); *A61M 16/009* (2013.01); *A61M 16/01* (2013.01); *A61M 2016/1025* (2013.01); *A61M 2016/103* (2013.01); *A61M 2016/1035* (2013.01); *A61M 16/104* (2013.01); *A61M 16/203* (2014.02); *A61M 16/208* (2013.01); *A61M 2202/0208* (2013.01); *A61M 2202/0225* (2013.01); *A61M 2202/0266* (2013.01); *A61M 2205/3331* (2013.01)

(58) Field of Classification Search
CPC .......... A61M 16/0057; A61M 16/0066; A61M 16/009; A61M 16/01; A61M 16/1005; A61M 16/104; A61M 16/12; A61M 16/145; A61M 16/203; A61M 16/208; A61M 2016/0027; A61M 2016/1025; A61M 2016/103; A61M 2016/1035; A61M 2202/0208; A61M 2202/0225; A61M 2202/0266; G09B 23/288; G09B 23/32

See application file for complete search history.

(56) References Cited

U.S. PATENT DOCUMENTS

| | | |
|---|---|---|
| 3,489,144 A | 1/1970 | Dibelius et al. |
| 5,403,192 A * | 4/1995 | Kleinwaks ............. G09B 23/28 434/272 |
| 7,959,443 B1 | 6/2011 | Frembgen et al. |

(Continued)

*Primary Examiner* — Joseph D. Boecker
(74) *Attorney, Agent, or Firm* — Abel Schillinger, LLP

(57) ABSTRACT

A lung simulator for partial simulation of functions of a lung, comprising at least one gas loop which is connected to a ventilator which is configured to convey a breathing gas into and/or out of the gas loop at least temporarily. The lung simulator comprises at least one device for setting the O2 concentration of the breathing gas in the gas loop, at least one device for setting the CO2 concentration of the breathing gas in the gas loop and at least one device for simulating a mechanical lung movement.

20 Claims, 9 Drawing Sheets

(51) Int. Cl.
  *G09B 23/28*   (2006.01)
  *G09B 23/32*   (2006.01)

(56) References Cited

U.S. PATENT DOCUMENTS

| | | | |
|---|---|---|---|
| 2007/0276508 A1* | 11/2007 | Fischer | A61M 1/1698 |
| | | | 623/23.65 |
| 2008/0060651 A1* | 3/2008 | Riecke | A61M 16/22 |
| | | | 128/205.28 |
| 2014/0174438 A1* | 6/2014 | Schmidt | B01D 53/229 |
| | | | 128/203.12 |
| 2020/0168125 A1 | 5/2020 | Sheedy et al. | |
| 2020/0349863 A1* | 11/2020 | Jensen | G09B 23/288 |
| 2020/0359935 A1* | 11/2020 | Clemensen | A61M 16/085 |
| 2022/0108632 A1* | 4/2022 | Wondka | G09B 23/32 |

* cited by examiner

PHYSIOLOGICAL LUNG SIMULATOR

CROSS-REFERENCE TO RELATED APPLICATIONS

The present application claims priority under 35 U.S.C. § 119 of German Patent Application No. 102021001279.8, filed Mar. 10, 2021, the entire disclosure of which is expressly incorporated by reference herein.

BACKGROUND OF THE INVENTION

1. Field of the Invention

The invention relates to a lung simulator which can simulate various functions of a lung.

2. Discussion of Background Information

Before a ventilator can be authorized, it is commonly necessary to test the functions of the instrument in order, for example, to rule out endangerment of the user or patient. This requires testing means which represent human breathing as closely as possible.

To this end, tests on animals, for example on pigs, are commonly carried out in order to test the functioning of a ventilator, especially in the case of anesthetic machines. Also known from the prior art are, for example, test lungs, which are usually limited to reproducing purely the mechanical function of the lungs, i.e., the flow of breathing gas into and out of the lungs.

In view of the foregoing it would be advantageous to have available a device which allows reliable testing of ventilators.

SUMMARY OF THE INVENTION

The present invention provides a lung simulator for partial simulation of functions of a lung, comprising at least one gas loop, wherein the gas loop is connected to a ventilator, wherein the ventilator is configured to convey a breathing gas into and/or out of the gas loop at least temporarily, wherein the lung simulator comprises at least one device for setting of the O2 concentration of the breathing gas in the gas loop, at least one device for setting of the CO2 concentration of the breathing gas in the gas loop and at least one device for simulation of mechanical lung movement. The ventilator can be a device for ventilation by machine and/or for manual ventilation, for instance a bag valve mask. Alternatively or additionally, the lung simulator can be operated without a ventilator, the device for simulation of mechanical lung movement carrying out the conveyance of the breathing gas in the gas loop and/or into/out of the gas loop.

In some embodiments, the lung simulator comprises a flushing gas course through which a flushing gas flows.

In some embodiments, the lung simulator the device for setting of the O2 concentration is a gas exchanger.

In some embodiments, the lung simulator the gas exchanger is configured to set the O2 concentration of the breathing gas in the gas loop by means of the flushing gas of the flushing gas course.

In some embodiments, the lung simulator O2 molecules and/or CO2 molecules and/or N2 molecules pass from the breathing gas into the flushing gas and/or from the flushing gas into the breathing gas in the gas exchanger at least locally and/or temporarily.

In some embodiments, the lung simulator the gas exchanger comprises at least one membrane.

In some embodiments, the lung simulator is characterized by the fact that the membrane is permeable at least to CO2 and/or O2 and/or N2.

In some embodiments, the lung simulator the membrane is configured and designed such that at least O2 molecules and/or CO2 molecules and/or N2 molecules pass from the breathing gas into the flushing gas and/or from the flushing gas into the breathing gas along the membrane.

In some embodiments, the lung simulator is characterized by the fact that the gas exchanger comprises at least two gas spaces, wherein the two gas spaces are separated from one another at least by the membrane.

In some embodiments, the lung simulator is characterized by the fact that the gas exchanger is configured and designed such that a breathing gas flows along the at least one membrane on one side at least locally and a flushing gas flows along the at least one membrane on the other side at least locally.

In some embodiments, the lung simulator is characterized by the fact that the at least one membrane is designed as at least one hollow fiber, wherein the at least one hollow fiber encloses one of the two gas spaces.

In some embodiments, the lung simulator is characterized by the fact that the gas exchanger comprises at least four gas spaces, wherein a first gas space is gaseously connected to a second gas space by at least one hollow fiber.

In some embodiments, the lung simulator is characterized by the fact that the at least one hollow fiber runs through the third gas space.

In some embodiments, the lung simulator is characterized by the fact that the at least one hollow fiber is a polymethylpentene hollow fiber or a polypropylene hollow fiber.

In some embodiments, the lung simulator is characterized by the fact that the first gas space has arranged thereon a port via which the flushing gas is conducted into the first gas space, the flushing gas is conducted from the first gas space into the second gas space via the at least one hollow fiber and the second gas space has arranged thereon a port via which the flushing gas is conducted out of the second gas space.

In some embodiments, the lung simulator is characterized by the fact that the third gas space has arranged thereon at least two ports via which the breathing gas is conducted into and/or out of the third gas space.

In some embodiments, the lung simulator is characterized by the fact that the ports of the third gas space are configured and arranged such that the breathing gas flows at least partially through the third gas space and, in doing so, flows at least partially around the at least one hollow fiber.

In some embodiments, the lung simulator is characterized by the fact that the at least one hollow fiber is configured and designed such that gas exchange between the flushing gas in the hollow fiber and the breathing gas flowing around the hollow fiber takes place at least partially.

In some embodiments, the lung simulator is characterized by the fact that the flushing gas has a lower O2 concentration than the breathing gas and O2 molecules pass from the breathing gas into the flushing gas in the gas exchanger.

In some embodiments, the lung simulator is characterized by the fact that the oxygen exchanger is an oxygenator, wherein the breathing gas of the gas loop is conducted by the blood circulation and the flushing gas of the flushing gas course is conducted by the breathing gas path.

In some embodiments, the lung simulator is characterized by the fact that the flushing gas course comprises at least one gas source from which a gas is conducted into the flushing gas course.

In some embodiments, the lung simulator is characterized by the fact that the flushing gas consists of at least two gases which are conducted from at least two gas sources into the flushing gas course and are mixed in a gas mixer.

In some embodiments, the lung simulator is characterized by the fact that one of the at least two gas sources is an oxygen source and/or a $CO_2$ source.

In some embodiments, the lung simulator is characterized by the fact that air and/or nitrogen is conducted from one of the at least two gas sources into the flushing gas course.

In some embodiments, the lung simulator is characterized by the fact that the gas mixer comprises at least one valve.

In some embodiments, the lung simulator is characterized by the fact that the gas mixer comprises at least one device for measurement of a differential pressure.

In some embodiments, the lung simulator is characterized by the fact that the gas mixer comprises at least one mixing chamber.

In some embodiments, the lung simulator is characterized by the fact that the at least one valve of the gas mixer is a proportional valve.

In some embodiments, the lung simulator is characterized by the fact that at least one oxygen sensor is arranged in the flushing gas course.

In some embodiments, the lung simulator is characterized by the fact that at least one valve is arranged in the flushing gas course.

In some embodiments, the lung simulator is characterized by the fact that the at least one valve is a 3/2-way valve.

In some embodiments, the lung simulator is characterized by the fact that the valve is arranged between a first oxygen sensor, the gas exchanger and a second oxygen sensor, wherein the second oxygen sensor is gaseously connected to the valve and the gas exchanger.

In some embodiments, the lung simulator is characterized by the fact that at least one differential pressure gauge is arranged in the flushing gas course.

In some embodiments, the lung simulator is characterized by the fact that the pressure gauge is arranged after the gas exchanger in the direction of flow.

In some embodiments, the lung simulator is characterized by the fact that the device for setting of the $CO_2$ concentration of the breathing gas in the gas loop is a $CO_2$ admixer.

In some embodiments, the lung simulator is characterized by the fact that the device for setting of the $CO_2$ concentration is arranged in the gas loop after the device for setting of the $O_2$ concentration in the direction of flow.

In some embodiments, the lung simulator is characterized by the fact that the $CO_2$ admixer is connected to a $CO_2$ source.

In some embodiments, the lung simulator is characterized by the fact that $CO_2$ is introduced into the breathing gas in the gas loop by means of the $CO_2$ admixer.

In some embodiments, the lung simulator is characterized by the fact that the $CO_2$ admixer comprises at least one valve, wherein the valve is connected to the gas loop.

In some embodiments, the lung simulator is characterized by the fact that the device for simulation of mechanical lung movement is arranged in the gas loop after the device for setting of the $CO_2$ concentration in the direction of flow.

In some embodiments, the lung simulator is characterized by the fact that the device for simulation of mechanical lung movement is a test lung.

In some embodiments, the lung simulator is characterized by the fact that the connection of the ventilator to the gas loop is arranged between the gas exchanger and the test lung.

In some embodiments, the lung simulator is characterized by the fact that at least one valve is arranged in the gas loop after the device for setting of the $O_2$ concentration in the direction of flow.

In some embodiments, the lung simulator is characterized by the fact that at least one valve is arranged between the device for setting of the $O_2$ concentration and the device for simulation of mechanical lung movement and at least one valve is arranged after the device for simulation of mechanical lung movement in the direction of flow.

In some embodiments, the lung simulator is characterized by the fact that the at least one valve is a check valve.

In some embodiments, the lung simulator is characterized by the fact that a valve is arranged between the gas exchanger and the $CO_2$ admixer.

In some embodiments, the lung simulator is characterized by the fact that a valve is arranged between the test lung and the connection of the ventilator to the gas loop.

In some embodiments, the lung simulator is characterized by the fact that the valves are check valves and/or controllable valves.

In some embodiments, the lung simulator is characterized by the fact that the device for setting of the $CO_2$ concentration of the gas in the gas loop is a gas exchanger.

In some embodiments, the lung simulator is characterized by the fact that the device for setting of the $CO_2$ concentration and the device for setting of the $O_2$ concentration are combined in one gas exchanger.

In some embodiments, the lung simulator is characterized by the fact that the flushing gas has a higher $CO_2$ concentration than the breathing gas and $CO_2$ molecules pass from the flushing gas into the breathing gas in the gas exchanger.

In some embodiments, the lung simulator is characterized by the fact that at least one filter is arranged in the gas loop.

In some embodiments, the lung simulator is characterized by the fact that the filter is configured to filter gas constituents at least partially.

In some embodiments, the lung simulator is characterized by the fact that the filter is configured to filter anesthetic gases at least partially from the gas of the gas loop.

In some embodiments, the lung simulator is characterized by the fact that the filter is an activated carbon filter.

In some embodiments, the lung simulator is characterized by the fact that the lung simulator comprises a device for setting of the breathing gas moisture content.

In some embodiments, the lung simulator is characterized by the fact that the device for setting of the breathing gas moisture content is a breathing gas humidifier.

In some embodiments, the lung simulator is characterized by the fact that the breathing gas humidifier is arranged after the test lung and before the connection of the ventilator in the gas loop in the direction of flow.

In some embodiments, the lung simulator is characterized by the fact that at least one device for simulation of blockages of the airways and/or apneas and/or cessations of breathing is arranged in the gas loop.

In some embodiments, the lung simulator is characterized by the fact that an artificial head with a mask is arranged between the lung simulator and the ventilator and the gas loop runs through the artificial head at least in part and the gas loop and the flushing gas course meet in a gas mixer, wherein the gas mixer is designed as a mixing chamber and wherein a pump is connected to the mixing chamber, by means of which at least a defined quantity of oxygen is removed from the mixing chamber, and wherein the removed quantity of oxygen is replaced by a corresponding quantity of CO2 from a gas source.

The invention also provides a gas exchanger, for example for use in a lung simulator. The gas exchanger comprises at least two gas spaces, wherein the two gas spaces are separated from one another at least by a membrane. Said gas exchanger is characterized by the fact that the gas exchanger is configured and designed such that a breathing gas flows along the at least one membrane on one side at least locally and a flushing gas flows along the at least one membrane on the other side at least locally and the at least one membrane is designed as at least one hollow fiber, wherein the at least one hollow fiber encloses one of the two gas spaces and wherein the membrane is permeable to O2 molecules and/or CO2 molecules and/or N2 molecules at least temporarily and/or locally.

In some embodiments, the gas exchanger is characterized by the fact that the gas exchanger comprises at least four gas spaces, wherein a first gas space is gaseously connected to a second gas space by at least the at least one hollow fiber and the at least one hollow fiber runs through the third gas space, wherein the first gas space has arranged thereon a port via which the flushing gas is conducted into the first gas space, the flushing gas is conducted from the first gas space into the second gas space via the at least one hollow fiber and the second gas space has arranged thereon a port via which the flushing gas is conducted out of the second gas space, wherein the third gas space has arranged thereon at least two ports via which the breathing gas is conducted into and/or out of the third gas space, wherein the ports of the third gas space are configured and arranged such that the breathing gas flows at least partially through the third gas space and, in doing so, flows at least partially around the at least one hollow fiber and wherein the at least one hollow fiber is configured and designed such that gas exchange between the flushing gas in the hollow fiber and the breathing gas flowing around the hollow fiber takes place at least partially.

A method for partial simulation of functions of a lung is characterized by the fact that, in a lung simulator as set forth in at least one of the embodiments set forth above, the O2 concentration and the CO2 concentration of a breathing gas guided in a gas loop are set and mechanical lung movements are simulated. It should be noted that the features listed individually in the embodiments can be combined with one another in any technically expedient fashion and indicate further configurations of the invention. The specification provides additional characterization and details of the invention, particularly in conjunction with the drawings.

The instant lung simulator can, for example, be used for training purposes by physicians, nurses and other caregivers. For instance, various situations can be recreated in which the operation of a ventilator can be practiced. For instance, various patient conditions can be recreated to which the caregiver/physician/nurse can respond. For example, can via various specific settings of gas flows, especially of oxygen flow, CO2 flow and nitrogen flow. With the aid of the lung simulator, caregivers/physicians/nurses can be trained on realistic ventilation situations.

In addition, manual ventilation, for instance by means of a bag valve mask, can be practiced on the basis of the lung simulator. To this end, additional sensors can be mounted in the gas loop, for example in order to determine the effectiveness of the ventilation. Through specifically chosen configurations of the test lung (as the device for simulation of lung movement), various resistances to ventilation can thus also be realized. Alternatively or additionally, pneumatic resistances can also be arranged in the gas loop to this end.

Besides use as a training tool, new developments can also be tested on the lung simulator. By simulation of certain situations, the response of the ventilator can be checked, for example. In addition, ventilation tests can, for example, be carried out over a relatively long period. This can avoid, in particular, ventilation tests in which animal experiments are necessary at present.

It should further be noted that an "and/or" conjunction which is used herein and which is found between two features and links them together should always be interpreted as meaning that only the first feature may be present in a first configuration of the subject matter of the invention, only the second feature may be present in a second configuration, and both the first and the second feature may be present in a third configuration.

A ventilator is to be understood to mean any device which assists a user or patient with natural respiration, undertakes the ventilation of the user or living being (e.g., patient and/or newborn and/or premature baby) and/or is used for respiratory therapy and/or influences the respiration of the user or patient in another way. By way of example, but without being an exhaustive list, these include CPAP and BiPAP machines, anaesthetic machines, respiratory therapy devices, (clinical, outpatient or emergency) ventilators, high-flow therapy devices and cough machines. Ventilators can also be understood to mean diagnostic devices for ventilation. Said diagnostic devices can generally be used to measure medical and/or respiration-based parameters of a living being. These also include devices which can measure and optionally process medical parameters of patients in combination with respiration or only in relation to respiration. In the context of the description, a ventilator can also be understood to mean a device for manual ventilation, for instance a bag valve mask.

Unless expressly described otherwise, a patient interface can be understood to mean any peripheral device which is designed for interaction of the measurement device with a living being, in particular for therapeutic or diagnostic purposes. In particular, a patient interface can be understood to mean a mask of a ventilator or a mask connected to the ventilator. Said mask can be a full-face mask, i.e., a mask surrounding the nose and mouth, or a nasal mask, i.e., a mask only surrounding the nose. Tracheal tubes or cannulas and so-called nasal cannulas can be used as a mask or patient interface, too. In some cases, the patient interface can also be a simple mouthpiece, for example a tube, through which the living being at least exhales and/or inhales.

In the context of the invention, the functions of a lung can, at least to some extent, also encompass functions of the upper airways, such as, for example, the humidification and/or warming of the breathing gas. Problems of the upper airways, such as a blockage for example, can also, in the broadest sense, be ranked among the functions of a lung. Accordingly, in some embodiments, the lung simulator is conFIG.d to simulate functions of the upper airways as well.

The lung simulator is essentially composed of at least three components:
 a device for setting of the O2 concentration
 a device for setting of the CO2 concentration
 a device for simulation of mechanical lung movement.

The above components are intended to simulate the physiological functions of a real lung as far as possible: the absorption of oxygen from the breathing gas, the release of CO2 to the breathing gas, and the flow of breathing gas due to expansion and compression of the lungs.

To this end, a breathing gas is guided in a loop between the three devices, and the loop can be additionally connected to a ventilator which can temporarily convey breathing gas into and, optionally, also out of the loop.

Setting of the O2 concentration is, for example, done by means of a gas exchanger, in which a flushing gas and the breathing gas can flow along a membrane and exchange gas across the membrane. In this case, the composition of the flushing gas is a determining factor for the quantity of oxygen filtered from the breathing gas. The membrane is, for example, a polymethylpentene membrane. Other membranes are also conceivable, though many membranes (e.g., many polypropylene membranes) offer comparatively poor control of oxygen exchange. Any gas is conceivable for the flushing gas, though, for filtration of oxygen from the breathing gas, it should be ensured that the O2 concentration in the flushing gas lies below the O2 concentration of the breathing gas. Particularly useful are air or air-like gas mixtures, such as, for instance, air admixed with oxygen, pure air, air diluted with nitrogen, or else a mixture of air, oxygen and nitrogen. A mixture of oxygen and nitrogen can be used as flushing gas, too.

For setting of the CO2 concentration, CO2 can be conducted into the breathing gas via a valve. In this case, the addition of CO2 is attuned to the filtration of oxygen.

The simulation of mechanical lung movement is, for example, realized by means of a conventional test lung. Said test lung can be of a passive design or else a mechanical test lung which actively imitates lung movement. The direction of gas flow in the loop is considerably influenced by the positioning of check valves.

In addition, a filter and/or a breathing gas humidifier can optionally also be arranged in the lung simulator. The filter can, for example, filter anesthetic gases from the breathing gas and thus simulate the absorption of anesthetic gases by the lungs. In addition, breathing gas is humidified and warmed in the upper airways—this physiological function can, for example, be simulated by means of a breathing gas humidifier.

In some embodiments, the gas loop can also contain a device which can simulate complaints of the airways, such as, for example, a blockage of the airways or a cessation of breathing (apnea). For example, what can be arranged in the gas loop to this end is a pressure-dependent resistance which does not open or only partially opens below an adjustable breathing gas pressure. For example, what can also be used to this end is a pressure-controlled valve which is controlled by the measurement values of a pressure sensor which is arranged immediately before the valve. Alternatively or additionally, the simulation of blockages or apneas can also be achieved by a (mechanical) test lung which is controlled by means of appropriate software.

Since at least the filtration of oxygen, the addition of CO2 and tidal volume are finely adjustable to some extent, various body sizes with or without diseases/symptoms (such as, for example, ineffective absorption of oxygen) can also be effectively simulated in addition to the general simulation of some functions of the lungs.

Variations of gases and gas mixtures can be conveyed as breathing gas from the ventilator into the gas loop. One example of breathing gas is air, which is sucked in from the environment by the ventilator and/or is provided as synthetic air and/or compressed air. In some cases, air can be additionally admixed with oxygen in order to achieve a higher oxygen concentration. In some cases, pure oxygen and/or a mixture of nitrogen and oxygen can also be used as breathing gas.

Suitable as flushing gas is essentially any gas or gas mixture having an oxygen concentration deviating from the breathing gas. If oxygen is to be filtered from the breathing gas, it should be ensured, for example, that the oxygen concentration of the flushing gas lies below the oxygen concentration of the breathing gas. Air (ambient air, compressed air, synthetic air) can, for example, be used as flushing gas. Pure nitrogen and/or a mixture of nitrogen and oxygen are suitable as flushing gas, too. Moreover, mixtures of air and oxygen, air and nitrogen, air with nitrogen and oxygen, air with CO2 and/or nitrogen with oxygen and CO2 are suitable as flushing gases, too.

In some embodiments, gas exchange is realized in a gas mixer, for example a mixing chamber. In the mixing chamber, the CO2 concentration is set such that it corresponds to a conversion of O2 to CO2 in a real lung. A natural CO2 concentration can, for example, be measured at the outlet of the gas loop or lung simulator. To this end, it is necessary for, firstly, CO2 to be supplied and, secondly, oxygen to be discharged as well. For example, a pump is used to discharge a quantity of breathing gas containing a quantity of oxygen corresponding to the naturally converted quantity. In return, for volume equalization and for setting of the correct CO2 concentration, additional CO2 and N2 is subsequently supplied from gas sources, for example as flushing gas. That fact that, in human respiration, somewhat more O2—ranging from $\frac{1}{5}$ to $\frac{1}{8}$, for example $\frac{1}{6}$—is absorbed than CO2 is released can also be taken into account here. Thus, this imbalance can be additionally factored into the gas exchange. A further pump and/or a test lung can be used to recreate the movement of breathing, at least inspiration and expiration. Additionally, the mixing chamber can be provided with convection means, for example a fan, in order to realize good mixing of the gases. Moreover, oxygen and CO2 sensors are provided in order to measure the concentration and/or quantity of oxygen and CO2 that is exchanged and/or is present in the breathing gas. In addition, pressure and/or flow sensors can be provided, for example in order to be able to measure and/or set the simulated breathing pressures and/or breathing flows. The gas loop is essentially described by the gas flow from the inlet of the lung simulator, for example at the passage of the artificial head, through the mixing chamber into the pump/test lung and back. Here, the flushing gas course is, for example, described by the gas flow from the gas sources (CO2, N2) through the mixing chamber and through the pump from the mixing chamber or lung simulator. Flushing gas course and gas loop (breathing gas) thus meet in the mixing chamber.

For example, an artificial head and/or a mask can also be arranged between the lung simulator and a connected ventilator. For example, the lung simulator can be used as a test rig for ventilation masks, the lung simulator being able to recreate breathing and to observe or measure various effects of the particular mask. In order, for example, to test the effect of admixing of oxygen to the breathing gas which is, for example, conveyed by the ventilator, what can be envisaged is that an exactly defined quantity of oxygen is always pumped from the mixing chamber. In return, concentration of CO2 due to rebreathing can also be tested, for example. The removal of a constantly identical quantity of oxygen from the mixing chamber and of a constantly identical quantity of CO2 flowing into the mixing chamber from the gas sources represents, for example, a constant turnover of CO2. Accordingly, the effects of change in oxygen and CO2, for instance due to the mask, can be tested.

In some embodiments, the lung simulator can also completely simulate breathing and there is also no need to connect a ventilator to the lung simulator. For example, the lung simulator is in this case configured such that the movement of breathing is recreated, for instance by means of the test lung, and ambient air is thus sucked in. For example, the lung simulator can thus be used together with an artificial head in order to test medical safety masks and/or industrial safety masks. In addition, other breathing effects can thus be tested, such as, for instance, the change in gas concentrations in ambient air.

BRIEF DESCRIPTION OF THE DRAWINGS

The invention will be described in more detail and by way of example on the basis of the drawings in which FIG. 1 schematically shows an exemplary embodiment of a lung simulator together with a ventilator.

Figure 1:
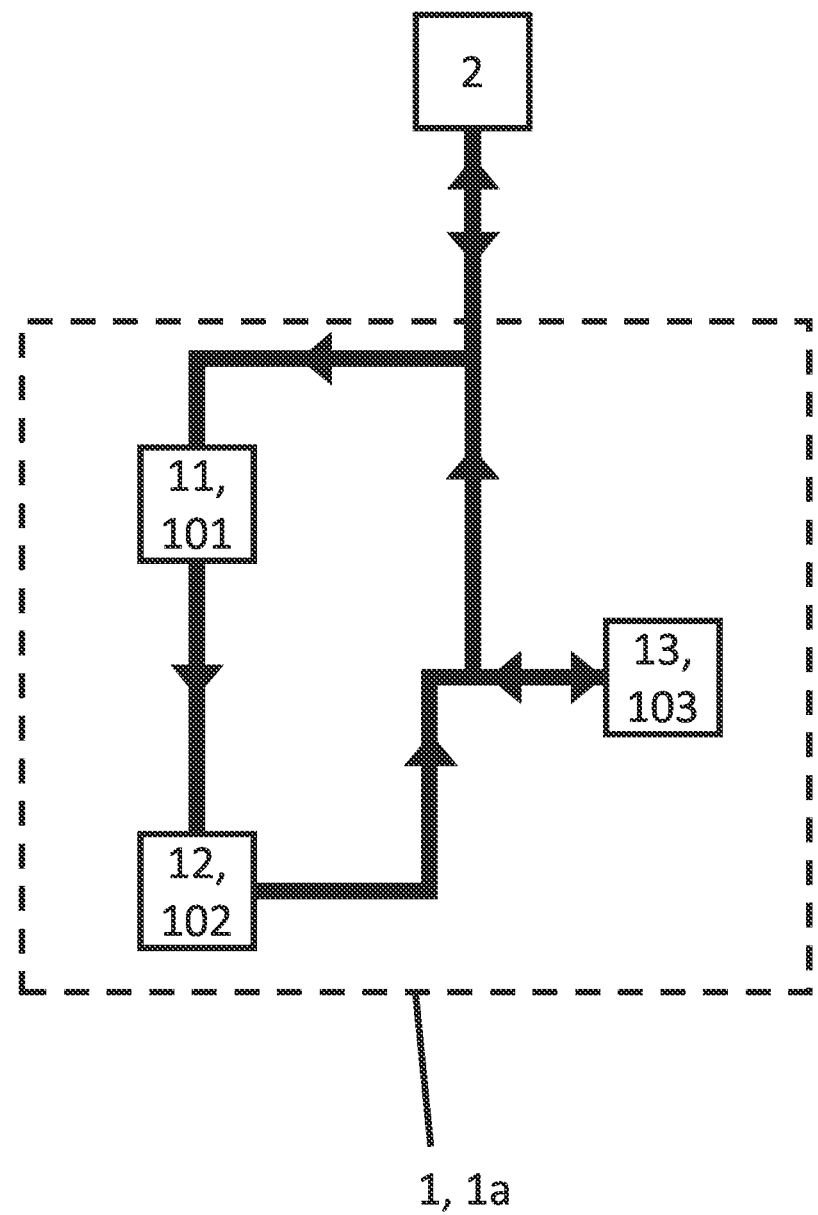

In the drawings, the arrow directions indicate the direction of flow of the particular gas. Where a connection, for example between two elements, has two arrow directions, the intention is to depict the possibility of flow in both directions. For example, the direction of flow then differs depending on the (simulated) breathing phase.

The individual devices and elements within the lung simulator are, where necessary, connected to one another gaseously. The gaseous connection is, for example, realized by hoses and/or tubes. In some embodiments, the devices can, at least in some cases, also directly follow one another, so that the outlet of one device is directly connected to the inlet of the next device.

The arrangement of the devices and elements is described by way of example in the FIG.s. It should be noted that the devices and elements can also be arranged in a different order in the light of the invention.

DETAILED DESCRIPTION OF EXEMPLARY EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

An exemplary embodiment of the lung simulator 1 together with a ventilator 2 is schematically depicted in FIG. 1. The lung simulator 1 comprises, by way of example, a gas loop 1a which is connected to the ventilator 2. Within the gas loop 1a, there is a device 11 for setting of the O2 concentration, a device 12 for setting of the CO2 concentration and a device 13 for simulation of mechanical lung movement.

The ventilator 2 is, by way of example, designed and configured to convey a gas, for example breathing gas. The ventilator 2 can convey breathing gas into the gas loop 1a at least temporarily. To this end, the ventilator 2 has at least one control unit which can control a valve of a breathing gas source and/or a fan as a breathing gas source. The ventilator 2 is moreover configured to measure and/or at least temporarily specify at least one breathing gas pressure and/or breathing gas flow. In some embodiments, the ventilator 2 is configured to specify at least one pressure pattern and/or flow pattern. For example, the ventilator 2 is also configured to detect and/or specify breathing patterns and/or phases of breathing, for example inspiration and expiration. The ventilator 2 is, for example, configured to specify at least one first level of pressure and/or flow for expiration and at least one second level of pressure and/or flow for inspiration. For the lung simulator 1, inspiration means that breathing gas is conveyed from the ventilator 1 into the gas loop 1a at least temporarily. In expiration, breathing gas flows out of the gas loop 1a at least temporarily, for example into the environment and/or into the ventilator 2. In some embodiments, the breathing gas is at least partially guided in a loop in the ventilator 2.

In some embodiments, the ventilator 2 has oxygen and/or CO2 sensors and/or is connected to such sensors.

In some embodiments, the ventilator 2 is configured such that, for example, oxygen can be admixed to the breathing gas in the ventilator 2 by means of an O2 source. In some embodiments, the ventilator 2 receives data about the oxygen saturation of the blood of the patient by means of a pulsoximeter and controls supply of oxygen to the breathing gas on the basis of said data. Therefore, in some embodiments, a device which generates or simulates measurement values is, for example, connected to the ventilator 2 instead of the pulsoximeter.

In some embodiments, the ventilator 2 controls supply of oxygen to the breathing gas on the basis of the measured concentration of oxygen in the breathing gas. In particular, in some embodiments in which the breathing gas is also guided in a loop in the ventilator 2, oxygen is subsequently fed into the breathing gas by the ventilator 2.

In some embodiments, the ventilator 2 has a breathing gas humidifier and/or a breathing gas heater and/or the ventilator 2 is connected to such devices.

In some embodiments, the ventilator 2 is designed as an anesthetic machine, an anesthetic gas being additionally supplied to the breathing gas. Especially if the ventilator 2 is designed as an anesthetic machine, the breathing gas flows from the gas loop 1a back into the ventilator 2 and is at least partially guided in a loop within the ventilator 2. During the inspiration and expiration phases, what then takes place at least partially is gas exchange between the gas loop 1a of the lung simulator 1 and the loop of the ventilator 2 designed as an anesthetic machine.

In some embodiments, the ventilator 2 can also be a device for manual ventilation, for example a bag valve mask.

The ventilator 2 is, by way of example, connected to the gas loop 1a of the lung simulator 1 via a Y-piece (or T-piece, generally a connecting piece having 3 gas paths). In some embodiments, sensors are arranged between the gas loop 1a and the ventilator 2, for example in order to measure flow, pressure, $CO_2$ concentration, $O_2$ concentration, temperature and/or humidity of the breathing gas. In some embodiments, the Y-piece, via which the gas loop 1a is connected to the ventilator 2 or from which a hose connection branches off to the ventilator 2, comprises at least one valve which opens and/or closes depending on the breathing phase (inspiration, expiration). In some embodiments, a patient interface, for example a mask, is arranged between gas loop 1a and ventilator 2.

By way of example, the connection point, i.e., the Y-piece for example, between gas loop 1a and ventilator 2 can be regarded as the start point and end point of the gas loop 1a. From the connection point, the breathing gas first flows through the gas exchanger 101, then through the $CO_2$ admixer 102 and lastly through or into and out the test lung 103.

The device 11 for setting of the $O_2$ concentration in the breathing gas of the gas loop 1a is, by way of example, designed as a gas exchanger 101. The gas exchanger 101 is, by way of example, configured and designed such that the $O_2$ concentration in the breathing gas, which flows through the gas loop 1a, can be set. By way of example, absorption of oxygen from the breathing gas in a lung is simulated by the gas exchanger 101, i.e., the $O_2$ concentration in the breathing gas of the gas loop 1a is reduced. By way of example, oxygen ($O_2$) is removed from the breathing gas to this end. In some embodiments, oxygen is, for example, removed from the breathing gas across a membrane. For example, to this end, a flushing gas having a lower $O_2$ concentration than the breathing gas is conducted along the membrane on one side and the breathing gas is conducted along the membrane on the other side. If the membrane is permeable at least to $O_2$ molecules, $O_2$ molecules can diffuse from the breathing gas into the flushing gas, thereby lowering the $O_2$ concentration in the breathing gas.

In some embodiments, the gas exchanger 101 is configured and designed such that the breathing gas of the gas loop 1a is mixed with a gas or gas mixture, so that the $O_2$ concentration in the breathing gas is diluted. Such a gas or gas mixture can, for example, be air and/or nitrogen ($N_2$) which is mixed with oxygen if necessary. If the $O_2$ concentration in the breathing gas is to be reduced, the gas or gas mixture which is being mixed with the breathing gas should have a lower $O_2$ concentration than the breathing gas. In order not to increase the flow rate in the gas loop 1a by the addition of the gas/gas mixture to the breathing gas compared to the flow rate specified by the ventilator 2, some of the diluted breathing gas can, for example, be conducted out of the gas loop 1a.

In some embodiments, the gas exchanger 101 can be set such that the $O_2$ concentration of the breathing gas can be increased or reduced as needed.

After the device 11 for setting of the $O_2$ concentration in the direction of flow, there is arranged, by way of example, the device 12 for setting of the $CO_2$ concentration. For example, the device 12 is designed as a $CO_2$ admixer 102. What is simulated by means of the $CO_2$ admixer 102 is, for example, the release of $CO_2$ from the lungs into the breathing gas. To this end, the $CO_2$ concentration of the breathing gas in the gas loop 1a is increased, for example by at least temporary addition of $CO_2$ by means of the $CO_2$ admixer 102. In some embodiments, the addition of $CO_2$ is already taken into account when setting the $O_2$ concentration in the gas exchanger 101, since additional admixing of $CO_2$ to the breathing gas dilutes the $O_2$ concentration.

In some embodiments, the $CO_2$ admixer 102 is configured such that $CO_2$ is conducted into the gas loop 1a at least temporarily by means of a (controllable) valve.

In some embodiments, the $CO_2$ admixer 102 can also be designed like the gas exchanger 101, so that $CO_2$ molecules can diffuse into and/or out of the breathing gas across a membrane. In some embodiments, the device 11 for setting of the $O_2$ concentration and the device 12 for setting of the $CO_2$ concentration are designed together as one gas exchanger 101. For example, the $O_2$ and $CO_2$ concentration is set by means of a flushing gas in the gas exchanger 101 and the absorption of $O_2$ and the release of $CO_2$ by the lungs is thus simulated. For example, to this end, the flushing gas has a lower $O_2$ concentration and a higher $CO_2$ concentration than the breathing gas.

After the device 12 for setting of the $CO_2$ concentration in the flow direction, there is arranged the device 13 for simulation of mechanical lung movement. By way of example, the device 13 is designed as a test lung 103. The test lung 103 is, for example, integrated into the gas loop 1a via a Y-piece, optionally also designed as a controllable valve, so that breathing gas can flow into and out of the test lung 103 via the same line.

In general, the test lung 103 is designed and configured such that respiratory flow during inspiration and expiration is simulated. To this end, breathing gas flows into the test lung 103 during inspiration, for example until a certain gas volume has been reached in the test lung 103, and breathing gas flows out of the test lung 103 during expiration.

The test lung 103 simulates, for example, the movement of the lungs during breathing. In some embodiments, lung movement during breathing is actively simulated by the test lung 103. For example, to this end, the test lung 103 is designed as bellows which is mechanically expanded and/or compressed depending on the breathing phase. If the bellows is expanded, what is generated within the test lung 103 is a negative pressure which causes breathing gas to flow from the gas loop 1a into the test lung 103. Inspiration is simulated, for example.

For example, the test lung 103 can be designed such that expansion (i.e., inspiration) is stopped after a certain volume that flows into the test lung 103 and/or after a certain time in which breathing gas flows into the test lung 103, and the bellows of the test lung 103 is recompressed. This generates, for example, a positive pressure which causes breathing gas to flow out of the test lung 103 into the gas loop 1a. Expiration is simulated, for example. In some embodiments, the test lung 103 is designed such that compression (i.e., expiration) is stopped after a certain volume that flows out of the test lung 103 and/or after a certain time in which breathing gas flows out of the test lung 103. In some embodiments, the test lung 103 is designed and configured such that inspiration and expiration are alternately simulated.

The ventilator 2 is, by way of example, designed to detect the movements of the test lung 103 as inspiration and/or expiration, for example via changes in pressure and/or flow, and to change accordingly the level of pressure and/or flow specified by the ventilator 2 (alternation between assisting inspiration and expiration).

In some embodiments, the lung simulator 1 can also be operated without a connected ventilator 2. The breathing gas in the gas loop 1a is then, for example, mainly brought about by the simulated lung movements due to, for example, the test lung 103 or the device 13 for simulation of mechanical lung movement.

In some embodiments of the lung simulator 1, the test lung 103 is of a passive design. In a passive design, movement of breathing is simulated only passively by the test lung 103. For example, to this end, the ventilator 2 is configured to specify at least one pressure level for inspiration and to specify one pressure level for expiration, the pressure level for inspiration being higher than the pressure level for expiration. During inspiration, breathing gas flows into the gas loop 1a and into the test lung 103, thereby expanding the test lung 103, for example. In some embodiments, the test lung 103 comprises a resistance which increases with increasing expansion and/or represents a maximum limit for expansion. After a certain time which represents the inspiration phase, the maximum expansion limit is reached and/or the resistance of the test lung reaches a magnitude corresponding to the inspiration pressure of the ventilator 2 and the test lung cannot expand further as a result. For example, the flow from the ventilator 2 into the gas loop 1a reaches a value which is detected by the ventilator 2 as a changeover point to expiration. At said changeover point, the ventilator 2 changes, for example, to the pressure level of expiration, which lies below the pressure level of inspiration. As a result, the pressure in the gas loop 1a is also reduced, which enables breathing gas to flow out of the test lung 103. At the start of expiration, the resistance of the test lung 103 exerts, for example, a pressure which lies above the expiration pressure of the ventilator 2, and breathing gas flows out of the test lung 103 as a result. After a certain time, the test lung 103 is compressed to the extent that the resistance corresponds to the expiration pressure of the ventilator 2, i.e., no further breathing gas can flow out of the test lung 103. The ventilator 2 detects, for example, from the flow value that expiration is completed and/or is close to being completed and can, for example, change over back to inspiration.

In some embodiments, the test lung 103 is a simple bellows which has its own volume-dependent resistance. In some embodiments, the test lung 103 comprises a bellows (or something comparable) which is stored in a device by means of which a resistance to expansion is specified. In some embodiments, the resistance of the test lung 103 is at least volume-dependent. In some embodiments, the resistance of the test lung 103 can be set according to a maximum lung volume, and so various lung volumes can be simulated.

Figure 2:
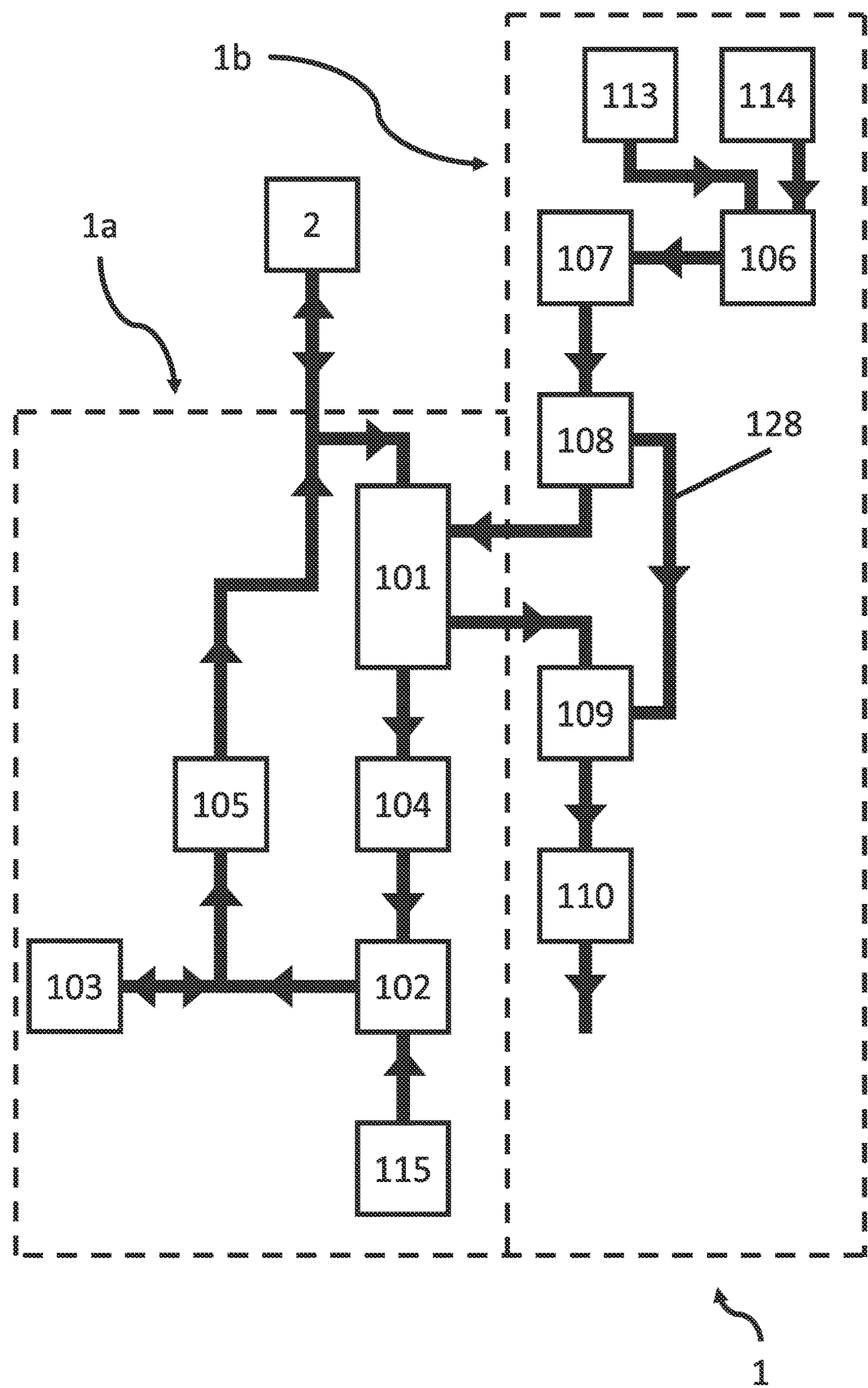
FIG. 2 schematically shows another exemplary embodiment of a lung simulator.

A further exemplary embodiment of the lung simulator 1 is schematically depicted in FIG. 2. Besides the gas loop 1a, the lung simulator 1 also additionally comprises in this case a flushing gas course 1b.

The ventilator 2 is connected to the gas loop 1a of the lung simulator 1, so that breathing gas can flow from the ventilator 2 at least into the gas loop 1a. In some embodiments, ventilator 2 and lung simulator 1 are connected such that breathing gas can flow from the ventilator 2 into the gas loop 1a at least temporarily and can flow from the gas loop 1a in the direction of the ventilator 2 at least temporarily. In some embodiments, breathing gas can escape from the gas loop 1a at least partially and at least temporarily by means of a valve and/or a leakage system. In particular, breathing gas can flow out of the gas loop 1a during the expiration phase. For example, the ventilator 2 can be connected to the lung simulator 1 via a dual-hose system.

After the connection between ventilator 2 and gas loop 1a in the direction of flow, there is arranged the gas exchanger 101. At least the O2 concentration of the breathing gas is set in the gas exchanger 101. In the exemplary embodiment shown, the absorption of oxygen from the breathing gas in the lungs is simulated using the gas exchanger 101. The O2 concentration of the breathing gas is thus reduced. The gas exchanger 101 is, by way of example, configured and designed such that oxygen is removed from the breathing gas or diffuses from the breathing gas. By way of example, the O2 concentration is set by means of a flushing gas which flows through a flushing gas course 1b. The flushing gas and the breathing gas flow on one side each of a membrane which is permeable (pervious) at least to O2 molecules. If the flushing gas has a lower O2 concentration than the breathing gas, O2 molecules diffuse from the breathing gas into the flushing gas through the membrane. Thus, some of the oxygen is filtered out of the breathing gas at the membrane of the gas exchanger 101.

The flushing gas used is at least one gas and/or gas mixture which has a lower O2 concentration than the breathing gas. In some embodiments, air can be used as flushing gas. In some embodiments, air is additionally admixed with oxygen and/or nitrogen. In some embodiments, the flushing gas is a mixture of oxygen and nitrogen. The flushing gas is provided by arranging at least one gas source 113 in the flushing gas course 1b. The gas source 113 can, for example, be a pressurized gas cylinder and/or a fan. In the exemplary embodiment of FIG. 2, two gas sources 113, 114 are arranged in the flushing gas course 1b. In some embodiments, three or more gas sources can also be arranged, for example in order to admix the composition of the flushing gas with further gases. In some embodiments, the gas sources 113, 114 each have at least one valve arranged thereafter, for example in order to be able to adjust the gas flow. In some embodiments, at least one of the gas sources 113, 114 is a source of compressed gas (gas cylinder, compressed gas line), the source of compressed gas optionally having a pressure regulator arranged thereafter.

The gases from the gas sources 113, 114 are, by way of example, mixed in a gas mixer 106. By way of example, the gas mixer 106 comprises for each gas source at least one valve and one device for measurement of the gas flow or the flow rate. The valve is, for example, designed such that the gas flow of the respective gas source 113,114 can be controlled by means of the valve. In some embodiments, the valve is designed as an electrically controllable valve, for example as a proportional valve. In some embodiments, the valves are controlled by means of a control unit. In some embodiments, the valves are controlled by means of the control unit such that the composition of the flushing gas can be automatically adjusted such that a desired O2 concentration in the breathing gas can be set by means of the flushing gas. The device for measurement of the gas flow in the gas mixer 106 is, for example, designed as a differential pressure gauge. It should be noted at this point that it is also possible to use any other measurement setups for determination of the gas flow or the flow rate.

In the gas mixer 106, the gases from the gas sources 113, 114 are mixed, so that a flushing gas having a lower O2 concentration than the breathing gas in the gas loop 1a is provided. For example, if air having an O2 concentration of about 21% is used as breathing gas in the gas loop 1a, the O2 concentration of the flushing gas must lie below 21% in order that oxygen diffuses from the breathing gas into the flushing gas in the gas exchanger 101. For example, to this end, one of the gas sources 113, 114 can be an air source and the other gas source 113, 114 can be a nitrogen source. In some embodiments, the difference in O2 concentration between breathing gas and flushing gas that is chosen must not be too great, for example in order to filter even relatively small quantities of oxygen from the breathing gas.

In the flushing gas course 1*b*, after the gas mixer 106 in the direction of flow, there is arranged an oxygen sensor 107 which measures the O2 concentration in the flushing gas before the gas exchanger.

The flushing gas is, by way of example, conducted to the gas exchanger 101 via a valve 108. In some embodiments, the valve 108 is a 3/2-way valve. As a result of changeover of the valve 108, the flushing gas can also be conducted via the bypass 128 without the flushing gas flowing through the gas exchanger 101. The bypass 128 is, for example, used for calibration of the oxygen sensors 107, 109.

After the gas exchanger 101, or after the valve 108 via the bypass 128, in the direction of flow, there is arranged a second oxygen sensor 109. Together with the data of the first oxygen sensor 107, it is thus possible to determine the quantity of oxygen which has diffused from the breathing gas into the flushing gas, i.e., has been removed/filtered from the breathing gas.

By way of example, a device for measurement of the gas flow or the flow rate is arranged after the second oxygen sensor 109. In the embodiment shown, a differential pressure gauge 110 is arranged here, for example. The flushing gas course 1*b* ends, by way of example, with an outlet into the ambient air. In some embodiments, the recycling of flushing gas is also contemplated. For example, the flushing gas can be further enriched with oxygen and be at least partially used as breathing gas for the gas loop 1*a*. In some embodiments, the flushing gas can also be recirculated, i.e., be reconducted in the flushing gas course 1*b*. Here, the O2 concentration must be adjusted again in the gas mixer 106, if necessary, in order for further absorption of oxygen in the gas exchanger 101 to be possible.

In the gas loop 1*a*, after the gas exchanger 101 in the direction of flow, there is arranged a valve 104. Said valve 104 is intended to prevent flow of breathing gas back into the gas exchanger 101, for example during the expiration phase. By way of example, the valve 104 is designed as a check valve, flow only being possible from the direction of the gas exchanger 101. In some embodiments, the valve 104 is a magnetically and/or electrically controlled valve which is open during the inspiration phase and is closed during the expiration phase. For example, to this end, the valve 104 can be controlled by means of a control unit which receives data from the ventilator 2 and/or the test lung 103 as to whether there is an expiration phase or an inspiration phase.

After the valve 104 in the direction of flow, there is arranged the CO2 admixer 102. The CO2 concentration of the breathing gas is set by means of the CO2 admixer. By way of example, the release of CO2 in a lung to the breathing gas is simulated by means of the CO2 admixer 102. Accordingly, the CO2 concentration in the breathing gas is increased by the CO2 admixer 102. By way of example, to this end, CO2 is conducted into the breathing gas from a CO2 source by the CO2 admixer 102. By way of example, the CO2 admixer comprises at least one controllable valve by means of which the quantity of CO2 which is conducted into the breathing gas is controlled. In some embodiments, the CO2 admixer 102 comprises a mixing chamber for better mixing of breathing gas and CO2. By way of example, the valve by means of which the CO2 admixer 102 conducts the CO2 into the breathing gas is a proportional valve.

In some embodiments, the CO2 admixer 102 is configured and designed such that CO2 is mixed into the breathing gas only during the inspiration phase. For example, to this end, the valve of the CO2 admixer 102 is controlled depending on the phases of breathing (inspiration, expiration) that are simulated and/or specified by the ventilator 2.

After the CO2 admixer 102 in the direction of flow, the test lung 103 is connected to the gas loop 1*a* via a Y-piece, for example. The test lung 103 (described in detail in relation to FIG. 1) is, by way of example, configured such that the flow of breathing gas due to lung movement (inspiration and expiration) is simulated. During inspiration, a certain volume of breathing gas, which is settable in some embodiments, can flow into the test lung 103. In some embodiments, a switch is made by the ventilator 2 to expiration after a certain, settable inspiration time, with a volume of breathing gas flowing out of, or being able to flow out of, the test lung 103. In some embodiments, the ventilator 2 detects, on the basis of the gas flow, that a switch is to be made between inspiration and expiration.

After the test lung 103, but before the connection between ventilator 2 and gas loop 1*a*, in the direction of flow, there is arranged a valve 105 by way of example. The valve 105 prevents breathing gas from being able to flow against the direction of flow during the inspiration phase. What is ensured is flow of the breathing gas during inspiration in the direction of flow from ventilator 2 toward gas exchanger 101. For example, the valve 105 is designed as a check valve which opens only in the direction of flow. In some embodiments, the valve 105 is a magnetically and/or electrically controlled valve which is open during the expiration phase and is closed during the inspiration phase. For example, to this end, the valve 105 can be controlled by means of a control unit which receives data from the ventilator 2 and/or the test lung 103 as to whether there is an expiration phase or an inspiration phase.

In some embodiments of the lung simulator 1, sensors for determination of flow rates, breathing gas pressures and gas concentration (at least O2 and/or CO2 concentration in the breathing gas) are arranged at least in the gas loop 1*a*. For example, an O2 sensor for determination of the O2 concentration of the breathing gas is situated before and/or after the gas exchanger 101. For example, the values can be used in order to adjust the composition of the flushing gas in the flushing gas course 1*b* and to thus also control the filtered quantity of oxygen from the breathing gas.

In some embodiments, a CO2 sensor can be arranged before and/or after the CO2 admixer 102 in the gas loop 1*a*. For example, this can be used to determine the quantity of CO2 mixed into the breathing gas. For example, the CO2 admixer 102 can be controlled via the CO2 concentrations determined by the CO2 sensor(s).

The data of the optional sensors in the gas loop 1*a* can, for example, also be compared with data and values determined by the ventilator 2. Thus, correct functioning of the ventilator 2 can be additionally ensured, for example.

Figure 3:
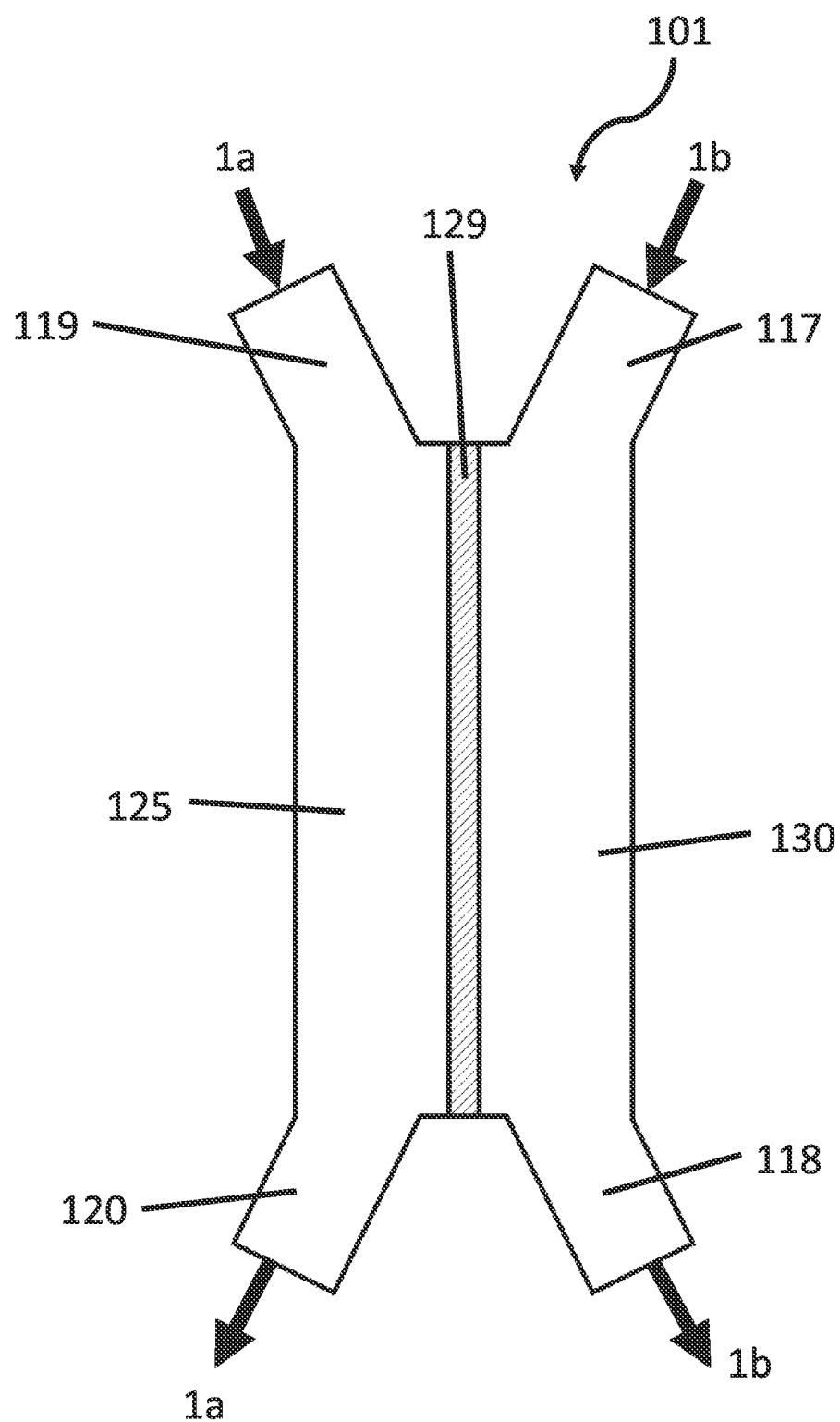
FIG. 3 schematically depicts an exemplary embodiment of a gas exchanger.

FIG. 3 schematically depicts an exemplary embodiment of a gas exchanger 101. Said gas exchanger 101 has at least two gas spaces 125, 130 which are substantially separated from one another by a membrane 129. The membrane 129 is, for example, permeable to certain molecules, but at least to O2 molecules. In some embodiments, the membrane is permeable at least to N2 and CO2 molecules as well. Via a port 119, breathing gas is, by way of example, conducted from the gas loop 1*a* into a gas space 125 and at least partially conducted along the membrane 129. Via a port 117, the flushing gas is, by way of example, conducted from the flushing gas course 1*b* into the gas space 130 and at least partially conducted along the membrane 129.

The membrane 129 is permeable at least to O2 molecules, so that oxygen can diffuse through the membrane from a gas mixture having a higher O2 concentration to a gas mixture having a lower O2 concentration. For example, the flushing gas is set such that the O2 concentration lies below the O2 concentration of the breathing gas of the gas loop 1a. Consequently, oxygen diffuses through the membrane from the breathing gas into the flushing gas, i.e., oxygen is removed or filtered from the breathing gas. This reduces the O2 concentration in the breathing gas.

For example, the membrane is made of polymethylpentene and/or polypropylene. Preference is given to using polymethylpentene.

Via the port 120, the breathing gas is conducted back into the gas loop 1a and, via the port 118, the flushing gas is conducted into the flushing gas course 1b. In some embodiments, the breathing gas flows with the same direction of flow as the flushing gas. In some embodiments, the flushing gas can, however, be conducted along the membrane against the direction of flow of the breathing gas. A direction of flow transverse to the breathing gas is possible, too.

Figure 4:
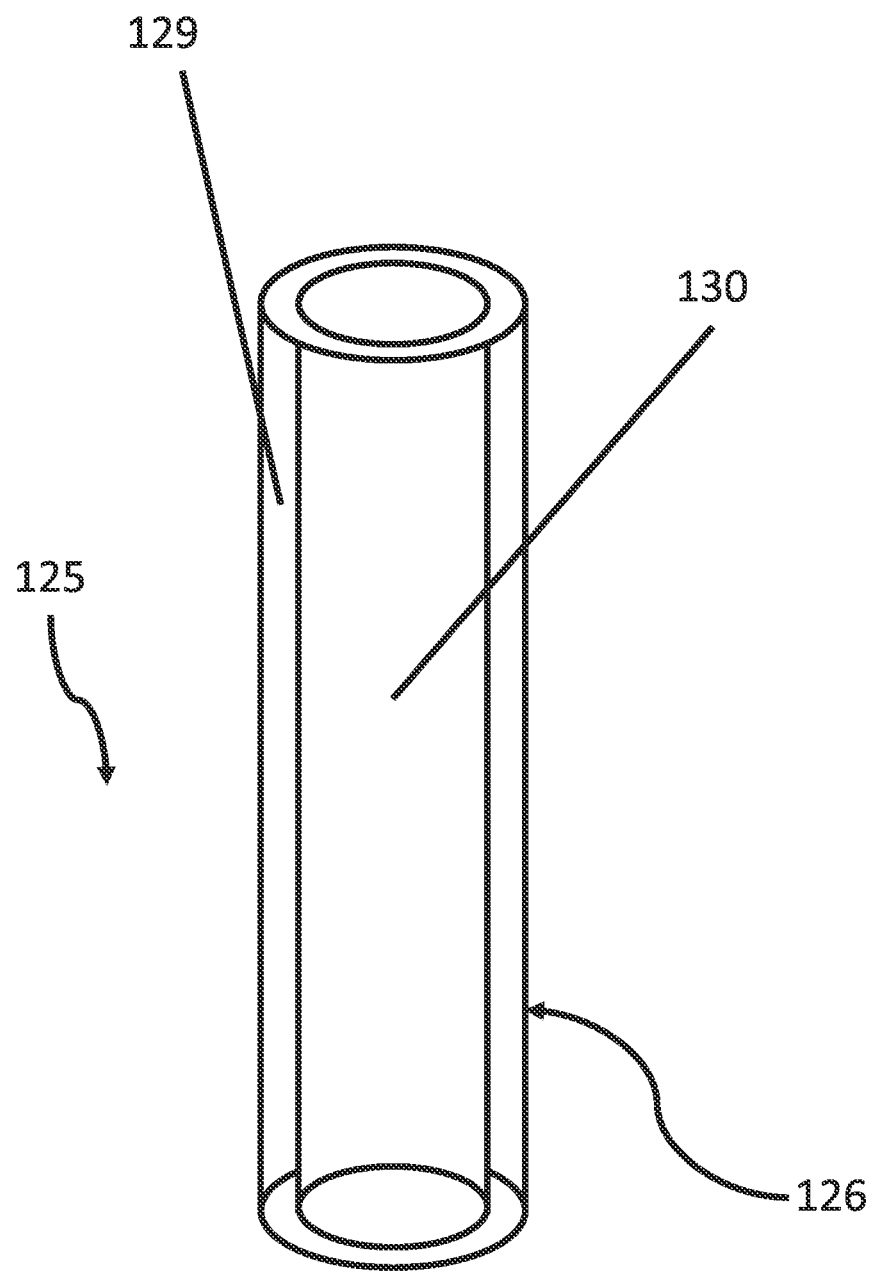
FIG. 4 schematically depicts a membrane surrounding a gas space to form a hollow fiber.

In some embodiments, the membrane 129 surrounds the gas space 130 to form a hollow fiber 126, as schematically depicted in FIG. 4. For example, the breathing gas can flow past the hollow fiber 126 externally through the gas space 125, whereas the flushing gas is, for example, conducted internally in the hollow fiber 126 through the gas space 130. As also in the embodiment described in FIG. 3, gas exchange between the flushing gas and the breathing gas can take place at or through the membrane 129. In some embodiments, the breathing gas can also be conducted internally through the hollow fiber 126, whereas the flushing gas is conducted externally past the hollow fiber 126.

The hollow fibers 126 used can, for example, be polymethylpentene and/or polypropylene hollow fibers. The internal diameter of the hollow fibers lies within a range from 100 µm to 500 µm, for example within a range around 200 µm (+/−10%). The thickness of the membrane lies within a range from 50 µm to 200 µm, preferably between 75 µm and 120 µm, for example within a range around 90 µm (+/−10%).

Figure 5:
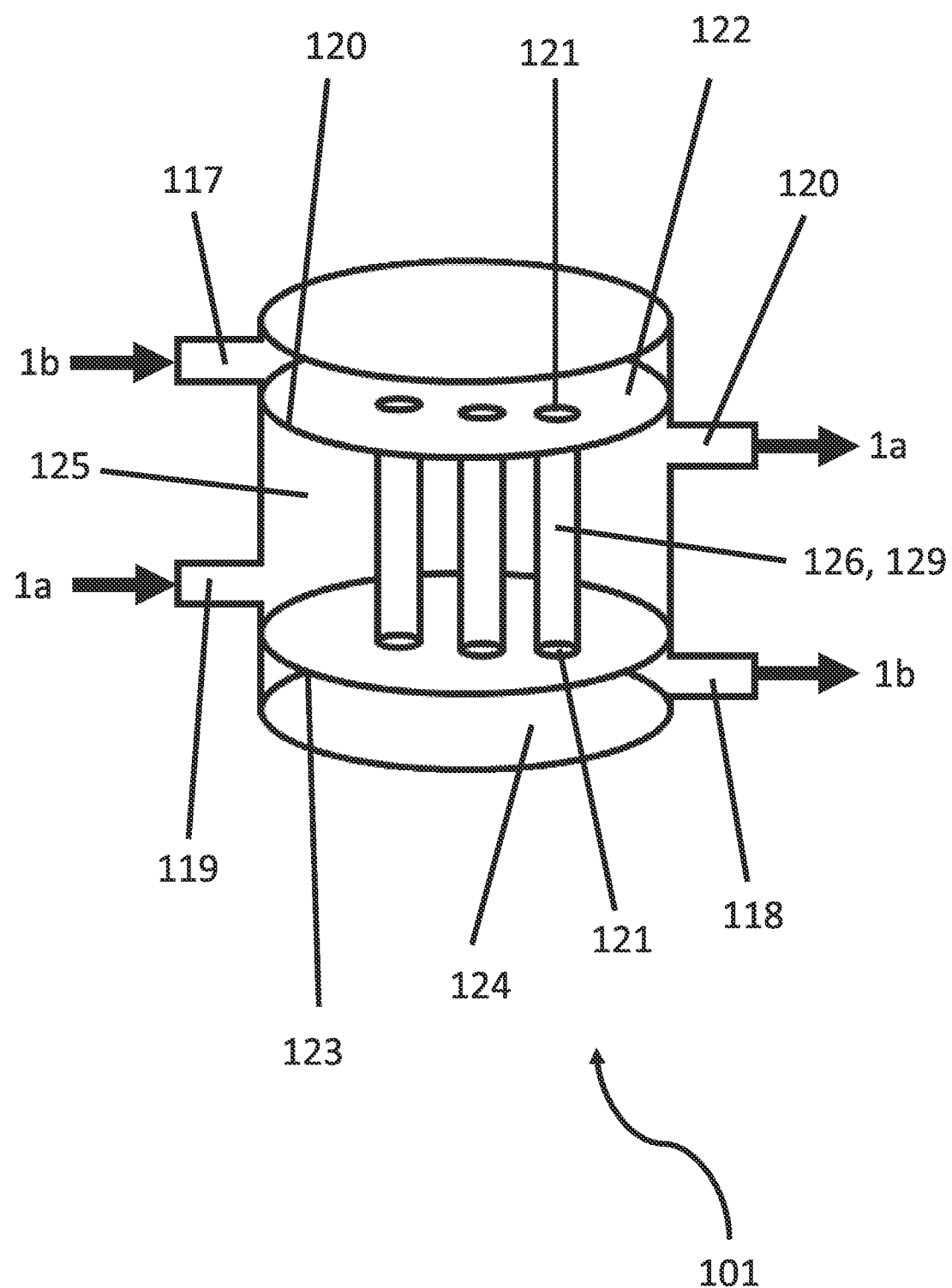
FIG. 5 schematically depicts a gas exchanger comprising a plurality of hollow fibers.

An exemplary embodiment of the gas exchanger 101 having a plurality of hollow fibers 126 is schematically depicted in FIG. 5. In this case, a first gas space 122 is connected to a second gas space 124 via a plurality of hollow fibers 126. The hollow fibers 126 run, for example, through the gas space 125. The gas space 125 is sealed with respect to the first gas space 122 and the second gas space 124 by seals 120, 123. Conducted through the gas space 125 is, for example, the breathing gas from the gas loop 1a, the breathing gas at least partially flowing past the hollow fibers 126. By way of example, the flushing gas is conducted into the first gas space 122 via the port 117. Via openings 121, the flushing gas can flow through the gas space 130 within the hollow fibers 126 into the second gas space 124.

Along the hollow fibers 126, gas exchange between the breathing gas and the flushing gas can occur. For example, oxygen can diffuse from the breathing gas with a higher O2 concentration into the flushing gas with a lower O2 concentration. Via careful setting of the composition of the flushing gas and the flow rate of the flushing gas, it is possible to specifically set the O2 concentration of the breathing gas. For example, a setting can be made such that a certain quantity of oxygen is removed or filtered from the breathing gas in order to simulate the absorption of oxygen from the breathing gas in a lung.

For example, the breathing gas flows transversely to the direction of flow of the flushing gas. In some embodiments, the ports 117, 118, 119, 120 can be arranged such that the breathing gas has a direction of flow substantially identical to the flushing gas and/or has a direction of flow substantially opposite to the flushing gas. In particular, the ports are arranged such that breathing gas substantially flows through the entire gas space 125.

In some embodiments, the breathing gas is conducted through the hollow fibers 126 from the first gas space 122 into the second gas space 124 and the flushing gas is guided through the gas space 125 past the hollow fibers 126.

Figure 6:
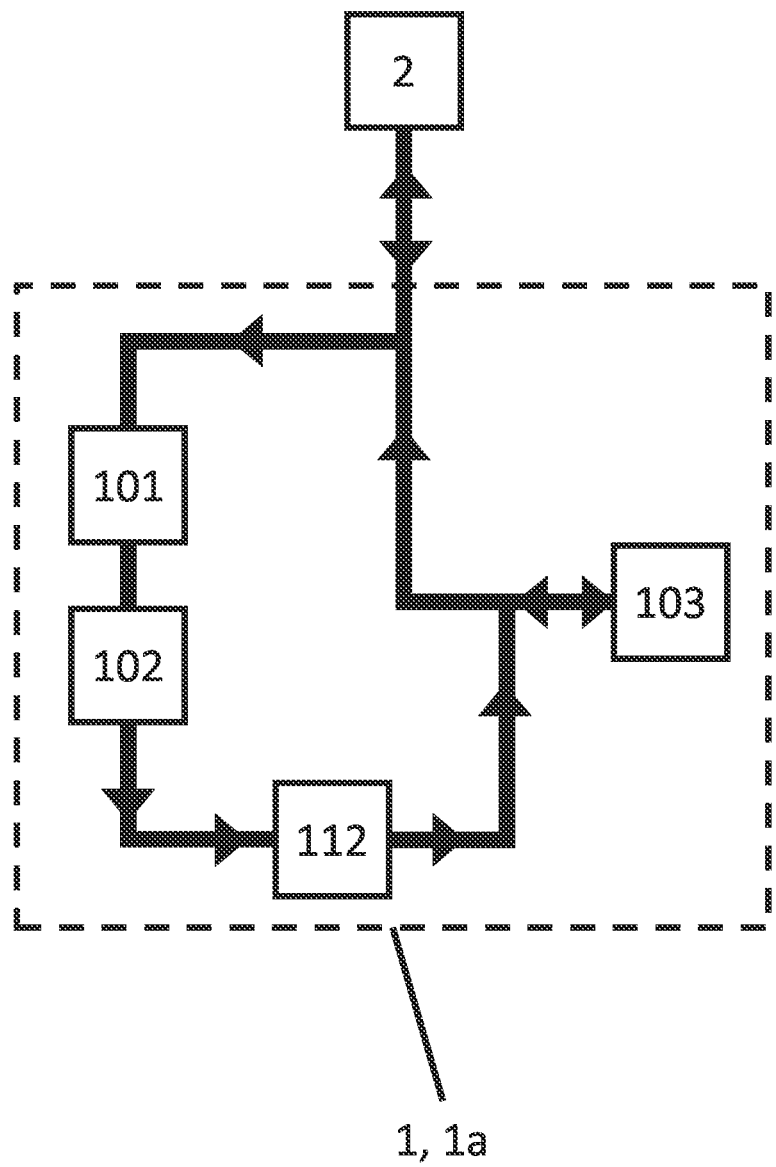
FIG. 6 schematically depicts an embodiment of a lung simulator with a filter arranged in a gas loop.

In a further exemplary embodiment of the lung simulator 1, a filter 112 is arranged in the gas loop 1a, as schematically depicted in FIG. 6. For example, the filter 112 is arranged to filter anesthetic gases at least partially from the breathing gas. The filter 112 is thus especially used if anesthetic gases are also flowing into the gas loop 1a via the ventilator 2. For example, the ventilator 2 is designed as an anesthetic machine to this end.

The exemplary embodiment depicted in FIG. 6 substantially corresponds to the exemplary embodiment described in relation to FIG. 1, with the additional arrangement of a filter 112 in the gas loop 1a. The filter 112 is, by way of example, configured to filter constituents from the breathing gas which, for example, are not constituents of pure air. In particular, at least anesthetic gases and/or hydrocarbons and/or halogenated hydrocarbons can be filtered from the breathing gas by means of the filter 112. In some embodiments, at least CO2, O2 and N2 are not filtered from the breathing gas by the filter 112 or a negligible proportion (<1%) is filtered.

By way of example, the filter 112 is designed as a carbon filter, for instance an activated carbon filter. Filter performance can, for example, be determined by the surface area of the activated carbon. The residence time of the breathing gas in the filter 112 can also be used as a factor for setting the filtered quantity of anesthetic gas. For example, the size (width, length) of the filter 112 can be adjusted to this end. Other types of filter, such as, for example, a polymeric membrane or a zeolite filter, are also conceivable as filter 112. In some embodiments, a combination of various filter materials is also usable.

The filter 112 is, by way of example, arranged between the CO2 admixer 102 and the test lung 103 or connection to the test lung 103.

Figure 7:
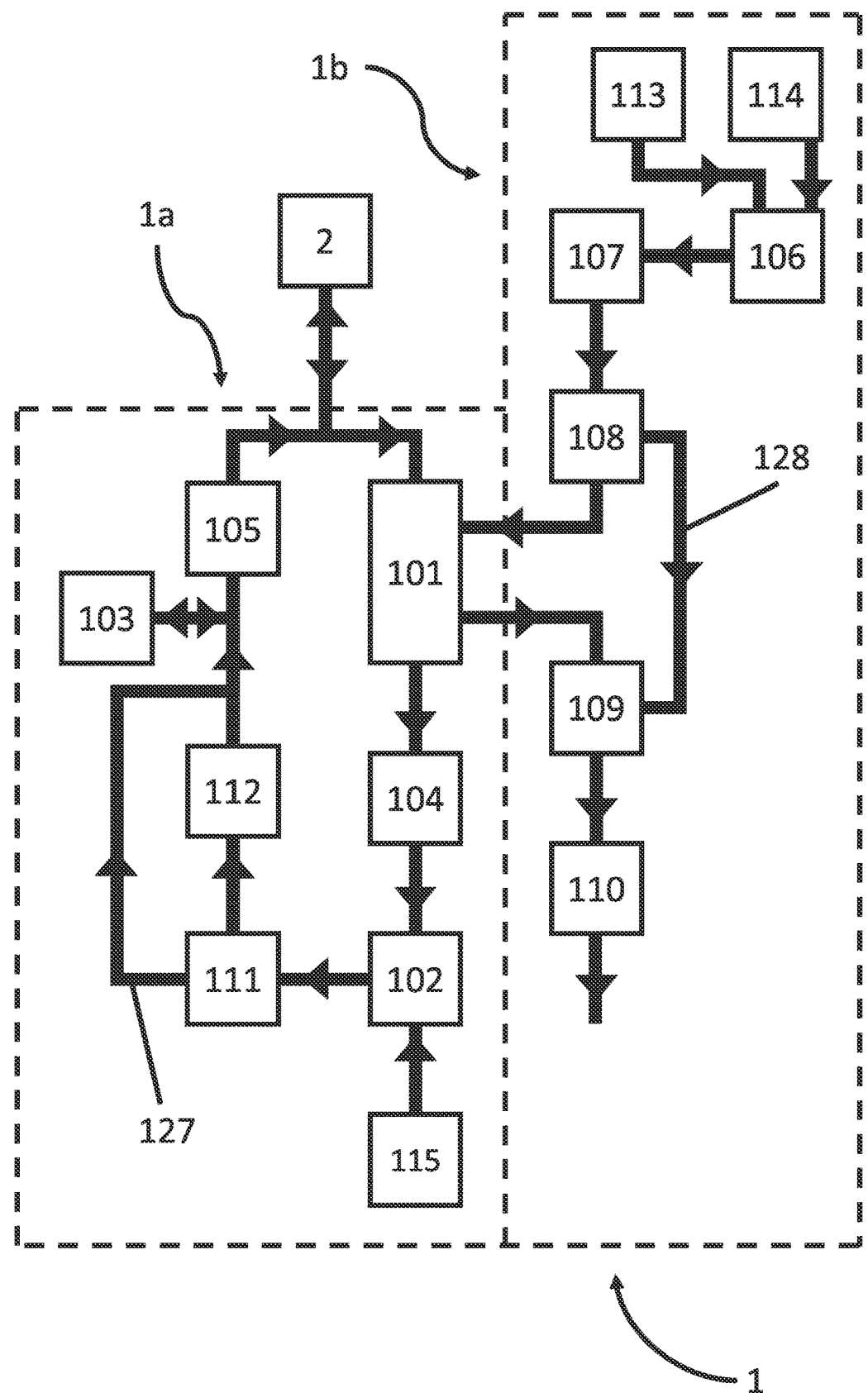
FIG. 7 shows a detailed diagram of the exemplary embodiment of the lung simulator from FIG. 6.

FIG. 7 shows a detailed diagram of the exemplary embodiment of the lung simulator 1 from FIG. 6. Here, the structure is substantially identical to the exemplary embodiments described in FIGS. 1 and 2, with additional arrangement of a filter 112 in the gas loop 1a. By way of example, the filter 112 is arranged between the CO2 admixer 102 and the test lung 103 or connection to the test lung 103. In the embodiment depicted, a bypass valve 111 is arranged between the filter 112 and the CO2 admixer 102. By means of the bypass valve 111, at least some of the breathing gas can be conducted past the filter 112 via the bypass 127. Via the quantity of breathing gas that is conducted via the bypass 127, it is, for example, also possible to set the quantity of anesthetic gas that is filtered from the breathing gas. The bypass 127 is guided such that, by means of the valve 111 before the filter 112, at least some of the breathing gas is conducted past the filter and flows back into the gas loop 1a before the test lung 103.

In some embodiments, additional sensors which can, for example, measure the concentration of anesthetic gas in the breathing gas are arranged before and/or after the filter 112. In some embodiments, a sensor for measurement of the concentration of anesthetic gas in the breathing gas is also arranged before the connection to the test lung 103. In some embodiments, the bypass valve 111 is controlled on the basis of the measured concentration of anesthetic gas in the breathing gas.

By means of the bypass valve 111, complete diversion of the flow of breathing gas through the bypass 127 is also possible, for example if the lung simulator 1 is not used with an anesthetic machine and no breathing gas is to be filtered by the filter 112.

Figure 8:
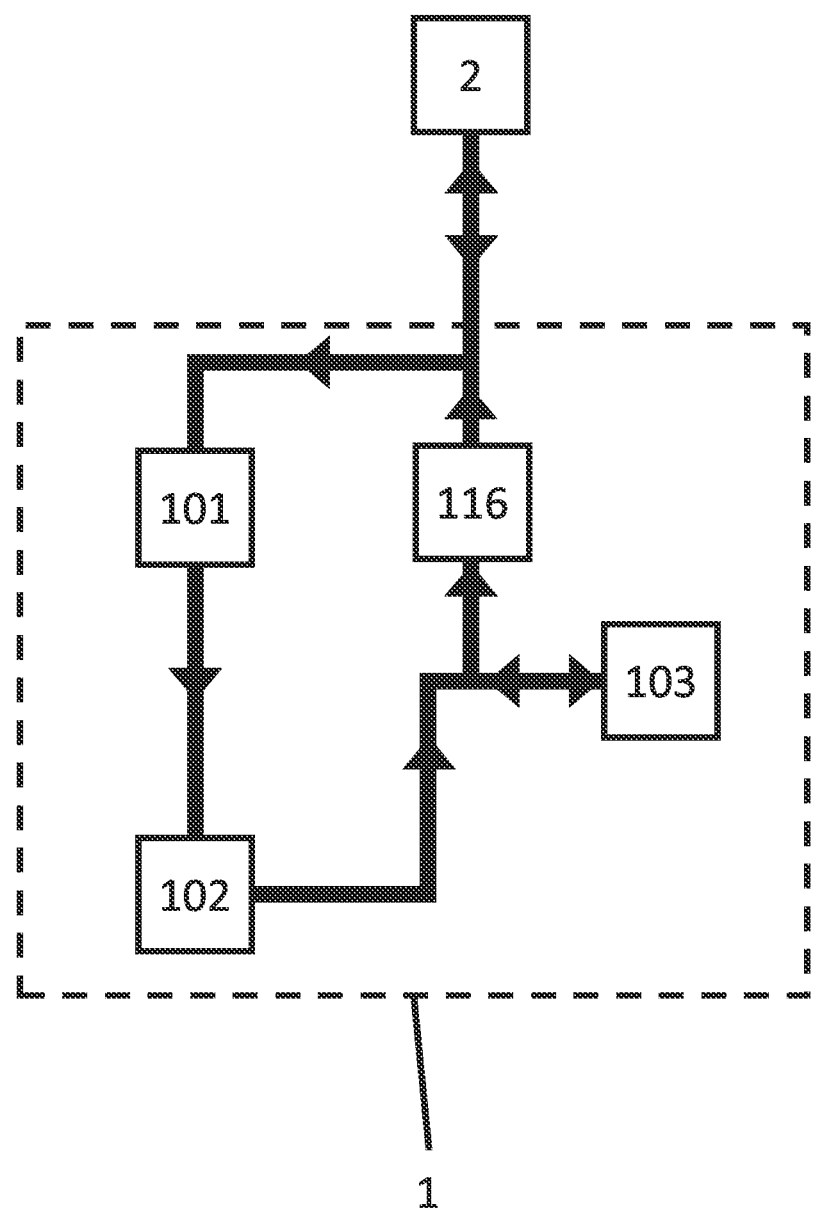
FIG. 8 shows a further exemplary embodiment of a lung simulator.

A further exemplary embodiment of the lung simulator 1 is schematically depicted in FIG. 8. Here, the structure is substantially identical to the exemplary embodiments described in FIGS. 1 and 2. In addition, a breathing gas humidifier 116 is arranged in the gas loop 1a in the embodiment depicted in FIG. 8. The breathing gas humidifier 116 simulates, for example, the humidification of the breathing gas during breathing. By way of example, the breathing gas humidifier 116 is arranged between the test lung 103 and the connection to the ventilator 2 in the direction of flow. The breathing gas humidifier 116 is, for example, configured such that the breathing gas of the gas loop 1a can be humidified. For example, the breathing gas humidifier 116 comprises to this end at least one liquid container, for example for water. The gas flow of the breathing gas is conducted through the breathing gas humidifier 116 such that the flow of breathing gas takes up moisture from the liquid in the liquid container, for example from the air above the liquid level. In some embodiments, the flow of breathing gas is conducted across the liquid level to this end. In some embodiments, the breathing gas humidifier 116 comprises at least one heating element which is configured to heat the liquid at least to some extent in order to increase the air humidity above the liquid level, for example in order to achieve higher humidification of the breathing gas. In some embodiments, a heating element which additionally heats the breathing gas is additionally provided. It is moreover conceivable for a humidity sensor which measures the humidity of the breathing gas in the gas loop 1a to be arranged before and/or after the breathing gas humidifier 116.

In some embodiments of the lung simulator 1, it is conceivable to arrange the breathing gas humidifier 116 together with the filter 112 as well. In some embodiments, the breathing gas humidifier 116 is arranged after the filter 112 in the direction of flow, for example in order to avoid unwanted humidification of the filter material in the filter 112. In some embodiments, the breathing gas humidifier 116 is arranged immediately before the valve 105 in the direction of flow (see FIGS. 2 and 7).

Figure 9:
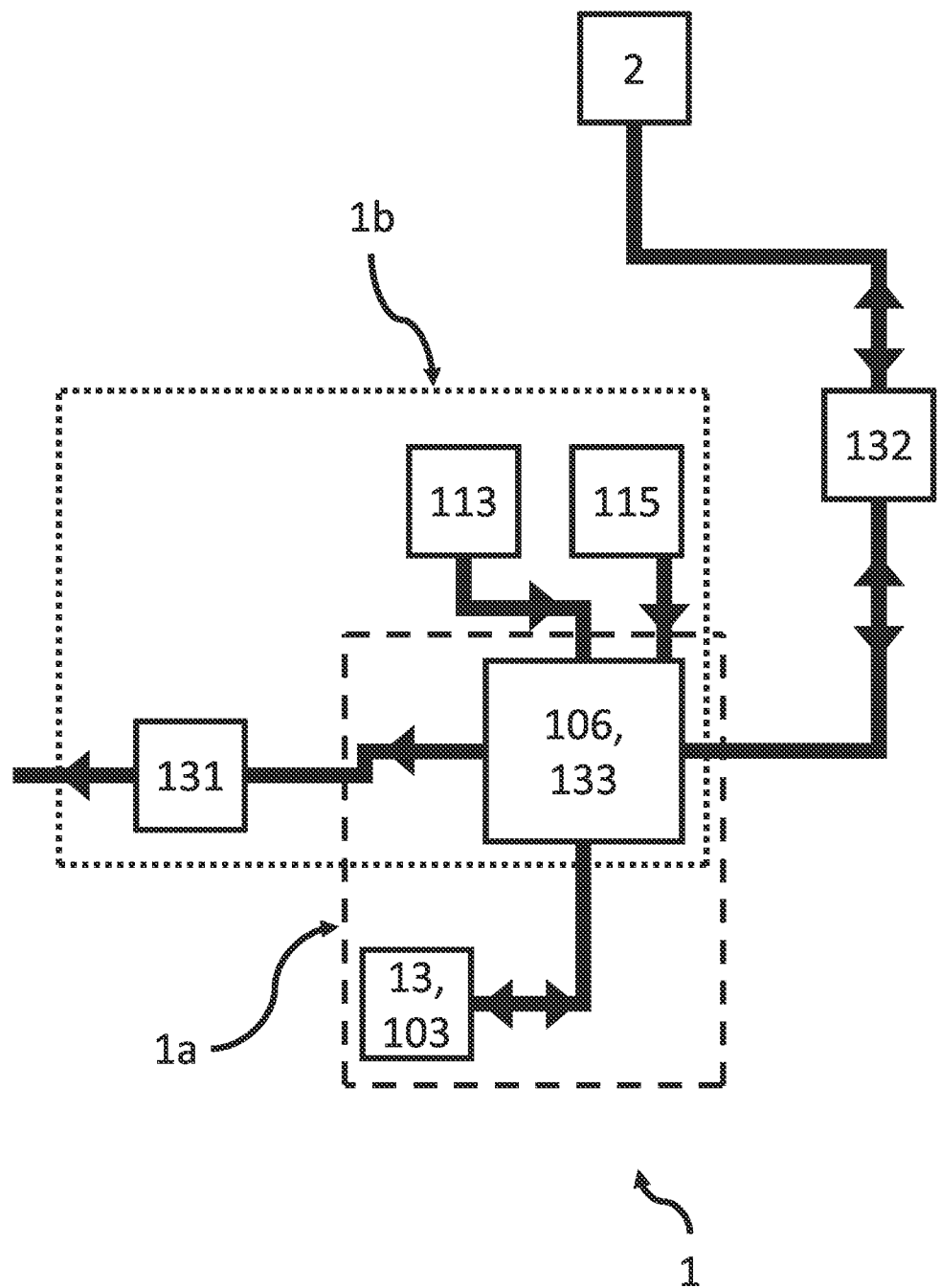
FIG. 9 schematically depicts a further exemplary embodiment of a lung simulator.

FIG. 9 schematically depicts a further exemplary embodiment of the lung simulator 1. Between the ventilator 2 and the lung simulator 1, there is arranged, by way of example, an artificial head 132. The connection between ventilator 2 and artificial head 132 can, for example, be established by means of a patient interface, for instance a mask. In order to be able to measure the gas composition in the region of the artificial head 132 or the mask, one or more gas sensors, for instance a CO2 sensor and/or an O2 sensor, can be arranged in the artificial head, for example. Moreover, flow sensors can be arranged at various points of the lung simulator. For example, a flow sensor can be arranged at least in the artificial head 132 in order to determine the flows and/or volumes which flow from the ventilator 2 into the lung simulator 1 during simulated inspiration and the flow and/or volume which flows through the artificial head 132 from the lung simulator 1 during expiration.

The ventilator 2 conveys breathing gas in the direction of the lung simulator 1 at least during simulated inspiration. In this case, inspiration can be actively simulated by the test lung 103 or ventilation can be due to the ventilator 2 or a mix of both. For simulation of active breathing by the lung simulator 1, the test lung 103 can, in some embodiments, also comprise a pump or some other device which simulates movement of breathing. The breathing gas conveyed by the ventilator 2 enters the gas loop 1a in the lung simulator 1, which gas loop 1a leads at least through the gas mixer 106, designed here as a mixing chamber 133, and the test lung 103. In the mixing chamber 133, the gas loop 1a also meets the flushing gas course 1b. The flushing gas is provided here by at least two gas sources 113, 115. In the embodiment shown, one of the gas sources 113, 115 is a CO2 source 115. In order to remove a defined quantity of oxygen from the breathing gas, some of the gas is removed from the gas loop 1a by means of the pump 131 connected to the mixing chamber 133. The defined quantity of oxygen is replaced by an identical quantity of CO2 from the CO2 source 115, and so the mixing of the gases yields a breathing gas in which the loss of oxygen concentration is balanced by a corresponding gain in CO2 concentration. In some embodiments, the fact that there is generally more absorption of oxygen than release of CO2 during breathing can be additionally taken into account. What can thus be additionally envisaged is subsequent feeding of a quantity of CO2 deviating by an appropriate factor in comparison with the quantity of oxygen pumped out. During breathing, there is generally between ⅕ and ⅛, for example ⅙, less CO2 released than oxygen absorbed. Since breathing gas, for instance CO2 and N2, is also sucked out together with the oxygen by means of the pump 131, it is moreover also necessary to resupply the quantities of N2 and CO2 which were removed, in order to even up the volume balance. It is thus ensured that the volume supplied during inspiration also corresponds to the volume of expiration. For better mixing of the gases in the gas mixer 106, a convection device, for instance a fan, can optionally also be provided. The quantities of oxygen, CO2 and N2 removed are, for example, determined by means of appropriate gas sensors, but at least CO2 and oxygen sensors, and by means of measurement of the volume sucked out by means of the pump 131. Alternatively or additionally, the volume can also be determined by means of known pump characteristics and, for example, the specified frequency/rotational speed.

The CO2 and oxygen sensors are, for example, arranged in the mixing chamber. Alternatively or additionally, the CO2 and/or oxygen sensors can also be connected to the mixing chamber 133, i.e., be arranged outside the mixing chamber 133. To this end, a gas flow can be generated, so that the gas loop 1a flows through the relevant sensors.

What can be envisaged for example is that, for every breathing cycle, the oxygen is first removed by the pump 131 and the volume is then balanced by inflow of additional CO2 and N2 from the gas sources 113, 115. In some embodiments, what can also be envisaged is that a target concentration of O2 and CO2 is first set by means of the gas sources 113, 115 and excess volume is then sucked out by means of the pump 131.

In some embodiments, the same quantity (number of molecules) of oxygen is always removed and is replaced by an identical quantity of CO2 corresponding to a conversion of oxygen to CO2 in the body. This can simulate a constant consumption of O2 and, for example, test effects such as CO2 accumulation, for instance due to rebreathing. In particular, it may be sufficiently possible to test the effect of the mask on the supply of breathing gas.

The connection between the artificial head 132 and the lung simulator 1 or mixing chamber 133 can be chosen such that it corresponds in length, diameter and/or volume to a windpipe. Moreover, the connection between the artificial head 132 and the mixing chamber 133 can be variable in dimensions in order, for example, to be able to recreate different body sizes. The same can also apply to the mixing chamber 133 and/or the test lung 103. For example, a certain lung volume can also be simulated via the size of the mixing chamber 133 and/or the test lung 103.

In some embodiments of the lung simulator 1, there can also be no connection of a ventilator 2. In this case, the gas flow within the gas loop 1a and/or into/out of the gas loop 1a, for example through the artificial head 132, is, for example, realized by the device 13 for simulation of mechanical lung movement, for example a test lung 103. It is thus possible, for example, to simulate the natural breathing of a living being without additional ventilation.

To sum up, the present invention provides:

1. A lung simulator for partial simulation of functions of a lung, wherein the lung simulator comprises at least one gas loop which is connected to a ventilator, the ventilator being configured to convey a breathing gas into and/or out of the gas loop at least temporarily, and wherein the lung simulator further comprises
   a. at least one device for setting the O2 concentration of the breathing gas in the gas loop,
   b. at least one device for setting the CO2 concentration of the breathing gas in the gas loop, and
   c. at least one device for simulating a mechanical lung movement.
2. The lung simulator of item 1, wherein the lung simulator further comprises a flushing gas course through which a flushing gas flows and wherein the device for setting the O2 concentration is a gas exchanger which is configured to set the O2 concentration of the breathing gas in the gas loop by making use of flushing gas of the flushing gas course.
3. The lung simulator of at least one of the preceding items, wherein O2 molecules and/or CO2 molecules and/or N2 molecules pass from the breathing gas into the flushing gas and/or from the flushing gas into the breathing gas in a gas exchanger at least locally and/or temporarily, wherein the gas exchanger comprises at least one membrane which is permeable at least to CO2 and/or O2 and/or N2, so that along the membrane at least O2 molecules and/or CO2 molecules and/or N2 molecules pass from the breathing gas into the flushing gas and/or from the flushing gas into the breathing gas.
4. The lung simulator of at least one of the preceding items, wherein the gas exchanger comprises at least two gas spaces which are separated from one another at least by the membrane, and the gas exchanger is configured and designed such that a breathing gas flows along the at least one membrane on one side at least locally and a flushing gas flows along the at least one membrane on the other side at least locally, the at least one membrane being present as at least one hollow fiber which encloses one of the at least two gas spaces.
5. The lung simulator of at least one of the preceding items, wherein the gas exchanger comprises at least four gas spaces, a first gas space being gaseously connected to a second gas space by at least one hollow fiber which runs through the third gas space and is configured and designed such that gas exchange between the flushing gas in the hollow fiber and the breathing gas flowing around the hollow fiber takes place at least partially.
6. The lung simulator of at least one of the preceding items, wherein the flushing gas course comprises at least one gas source from which a gas is conducted into the flushing gas course and wherein the flushing gas consists of at least two gases which are conducted from at least two gas sources into the flushing gas course and are mixed in a gas mixer.
7. The lung simulator of at least one of the preceding items, wherein one of the at least two gas sources is an oxygen source and/or a CO2 source and air and/or nitrogen is conducted from one of the at least two gas sources into the flushing gas course.
8. The lung simulator of at least one of the preceding items, wherein the gas mixer comprises at least one valve which is a proportional valve and the gas mixer comprises at least one device for measurement of a differential pressure.
9. The lung simulator of at least one of the preceding items, wherein the gas mixer comprises at least one mixing chamber.
10. The lung simulator of at least one of the preceding items, wherein at least one valve is arranged in the flushing gas course, which at least one valve is a 3/2-way valve, the at least one valve being arranged between a first oxygen sensor, the gas exchanger and a second oxygen sensor, wherein the second oxygen sensor is gaseously connected to the valve and the gas exchanger and at least one differential pressure gauge is arranged in the flushing gas course after the gas exchanger in the direction of flow.
11. The lung simulator of at least one of the preceding items, wherein the device for setting the CO2 concentration of the breathing gas in the gas loop is a CO2 admixer and is arranged in the direction of flow in the gas loop after the device for setting the O2 concentration and the CO2 admixer is connected to a CO2 source, CO2 being introduced into the breathing gas in the gas loop by the CO2 admixer, the CO2 admixer comprising at least one valve which is connected to the gas loop.
12. The lung simulator of at least one of the preceding items, wherein the device for simulating a mechanical lung movement is arranged in the gas loop in the direction of flow after the device for setting the CO2 concentration and the connection of the ventilator to the gas loop is arranged between the gas exchanger and the test lung.
13. The lung simulator of at least one of the preceding items, wherein at least one valve is arranged between the device for setting the O2 concentration and the device for simulating a mechanical lung movement and at least one valve is arranged after the device for simulating a mechanical lung movement in the direction of flow, one of the valves being arranged between the gas exchanger and the CO2 admixer and the other valve being arranged between the test lung and the connection of the ventilator to the gas loop, the valves being check valves and/or controllable valves.
14. The lung simulator of at least one of the preceding items, wherein the device for setting the CO2 concentration of the gas in the gas loop is a gas exchanger and the device for setting the CO2 concentration and the device for setting the O2 concentration are combined in one gas exchanger.

15. The lung simulator of at least one of the preceding items, wherein at least one filter is arranged in the gas loop, which filter is configured to filter gas constituents at least partially.
16. The lung simulator of at least one of the preceding items, wherein the filter is configured to filter anesthetic gases at least partially from the gas of the gas loop.
17. The lung simulator of at least one of the preceding items, wherein at least one device for simulation of blockages of the airways and/or apneas and/or cessations of breathing is arranged in the gas loop.
18. The lung simulator of at least one of the preceding items, wherein an artificial head with a mask is arranged between the lung simulator and the ventilator and the gas loop runs through the artificial head at least in part and the gas loop and the flushing gas course meet in a gas mixer, the gas mixer being designed as a mixing chamber and a pump being connected to the mixing chamber, by which pump at least a defined quantity of oxygen is removed from the mixing chamber, and wherein the removed quantity of oxygen is replaced by a corresponding quantity of CO2 from a gas source.
19. A gas exchanger, wherein the gas exchanger comprises at least two gas spaces which are separated from one another at least by a membrane, and wherein the gas exchanger is configured and designed such that a breathing gas flows along the at least one membrane on one side at least locally and a flushing gas flows along the at least one membrane on the other side at least locally and the at least one membrane is designed as at least one hollow fiber which encloses one of the two gas spaces and is permeable to O2 molecules and/or CO2 molecules and/or N2 molecules at least temporarily and/or locally.
20. The gas exchanger of item 19, wherein the gas exchanger comprises at least four gas spaces, a first gas space being gaseously connected to a second gas space by at least the at least one hollow fiber which runs through the third gas space, the first gas space having arranged thereon a port via which the flushing gas is conducted into the first gas space, the flushing gas being conducted from the first gas space into the second gas space via the at least one hollow fiber and the second gas space having arranged thereon a port via which the flushing gas is conducted out of the second gas space, wherein the third gas space has arranged thereon at least two ports via which the breathing gas is conducted into and/or out of the third gas space, the at least two ports of the third gas space being configured and arranged such that the breathing gas flows at least partially through the third gas space and, in doing so, flows at least partially around the at least one hollow fiber, which at least one hollow fiber is configured and designed such that gas exchange between the flushing gas in the hollow fiber and the breathing gas flowing around the hollow fiber takes place at least partially.
21. A method for partial simulation of functions of a lung, wherein, in a lung simulator as set forth in at least one of the preceding items, the O2 concentration and the CO2 concentration of a breathing gas guided in a gas loop are set and mechanical lung movements are simulated.

LIST OF REFERENCE SIGNS

1 Lung simulator
1a Gas loop
1b Flushing gas course
2 Ventilator
11 Device (for setting of the O2 concentration)
12 Device (for setting of the CO2 concentration)
13 Device (for simulation of mechanical lung movement)
101 Gas exchanger
102 CO2 admixer
103 Test lung
104 Valve
105 Valve
106 Gas mixer
107 Oxygen sensor
108 Valve
109 Oxygen sensor
110 Differential pressure gauge
111 Valve
112 Filter
113 Gas source
114 Gas source
115 CO2 source
116 Breathing gas humidifier
117 Port
118 Port
119 Port
120 Port
121 Opening
122 Gas space
123 Seal
124 Gas space
125 Gas space
126 Hollow fiber
127 Bypass
128 Bypass
129 Membrane
130 Gas space
131 Pump
132 Artificial head
133 Mixing chamber

What is claimed is:
1. A lung simulator for partial simulation of functions of a lung, wherein the lung simulator comprises at least one gas loop which is connected to a ventilator, the ventilator being configured to convey a breathing gas into and/or out of the at least one gas loop at least temporarily, and wherein the lung simulator further comprises
  (a) at least one device for setting an O2 concentration of the breathing gas in the at least one gas loop,
  (b) at least one device for setting a CO2 concentration of the breathing gas in the at least one gas loop, provided that (a) and (b) may be combined in a single device, and
  (c) at least one device for simulating a mechanical lung movement,
  the lung simulator further comprising a flushing gas course through which a flushing gas flows and (a) being a gas exchanger which is configured to set the O2 concentration of the breathing gas in the at least one gas loop by making use of flushing gas of the flushing gas course.
2. The lung simulator of claim 1, wherein O2 molecules and/or CO2 molecules and/or N2 molecules pass from the breathing gas into the flushing gas and/or from the flushing gas into the breathing gas in the gas exchanger at least locally and/or temporarily, wherein the gas exchanger comprises at least one membrane which is permeable at least to CO2 and/or O2 and/or N2, so that along the at least one membrane at least O2 molecules and/or CO2 molecules and/or N2 molecules pass from the breathing gas into the flushing gas and/or from the flushing gas into the breathing gas.

3. The lung simulator of claim 2, wherein the gas exchanger comprises at least two gas spaces which are separated from one another at least by the at least one membrane, and the gas exchanger is configured and designed such that the breathing gas flows along the at least one membrane on one side at least locally and the flushing gas flows along the at least one membrane on the other side at least locally, the at least one membrane being present as at least one hollow fiber which encloses one of the at least two gas spaces.

4. The lung simulator of claim 3, wherein the gas exchanger comprises at least four gas spaces, a first gas space being gaseously connected to a second gas space by the at least one hollow fiber which runs through a third gas space and is configured and designed such that gas exchange between the flushing gas in the at least one hollow fiber and the breathing gas flowing around the at least one hollow fiber takes place at least partially.

5. The lung simulator of claim 1, wherein the flushing gas course comprises at least one gas source from which a gas is conducted into the flushing gas course and wherein the flushing gas consists of at least two gases which are conducted from at least two gas sources into the flushing gas course and are mixed in a gas mixer.

6. The lung simulator of claim 5, wherein one of the at least two gas sources is an oxygen source and/or a CO2 source and air and/or nitrogen is conducted from one of the at least two gas sources into the flushing gas course.

7. The lung simulator of claim 5, wherein the gas mixer comprises at least one valve which is a proportional valve and the gas mixer comprises at least one device for measurement of a differential pressure.

8. The lung simulator of claim 5, wherein the gas mixer comprises at least one mixing chamber.

9. The lung simulator of claim 1, wherein at least one valve is arranged in the flushing gas course, which at least one valve is a 3/2-way valve, the at least one valve being arranged between a first oxygen sensor, the gas exchanger and a second oxygen sensor, wherein the second oxygen sensor is gaseously connected to the at least one valve and the gas exchanger and at least one differential pressure gauge is arranged in the flushing gas course after the gas exchanger in the direction of flow.

10. The lung simulator of claim 1, wherein (b) in the at least one gas loop is a CO2 admixer and is arranged in a direction of flow in the at least one gas loop after (a) and is connected to a CO2 source, CO2 being introduced into the breathing gas in the at least one gas loop by the CO2 admixer, which CO2 admixer comprises at least one valve which is connected to the at least one gas loop.

11. The lung simulator of claim 1, wherein (c) is arranged in the at least one gas loop in a direction of flow after (b) and the connection of the ventilator to the at least one gas loop is arranged between the gas exchanger and (c) in the form of a test lung.

12. The lung simulator of claim 10, wherein one valve is arranged between (a) and (c) and at least one another valve is arranged after (c) in a direction of flow, one of the valves being arranged between the gas exchanger and the CO2 admixer and the other valve being arranged between (c) in the form of a test lung and a connection of the ventilator to the at least one gas loop, the valves being check valves and/or controllable valves.

13. The lung simulator of claim 1, wherein (b) is a gas exchanger and (b) and (a) are combined in a single gas exchanger.

14. The lung simulator of claim 1, wherein at least one filter is arranged in the at least one gas loop, which at least one filter is configured to filter gas constituents at least partially.

15. The lung simulator of claim 14, wherein the at least one filter is configured to filter anesthetic gases at least partially from the at least one gas of the at least one gas loop.

16. The lung simulator of claim 1, wherein at least one device for simulation of blockages of airways and/or apneas and/or cessations of breathing which is different from (c) is arranged in the at least one gas loop.

17. The lung simulator of claim 1, wherein an artificial head with a mask is arranged between the lung simulator and the ventilator and the at least one gas loop runs through the artificial head at least in part and the at least one gas loop and the flushing gas course meet in a gas mixer, the gas mixer being designed as a mixing chamber and a pump being connected to the mixing chamber, by which pump at least a defined quantity of oxygen is removed from the mixing chamber, the removed quantity of oxygen being replaced by a corresponding quantity of CO2 from a gas source.

18. A method for partial simulation of functions of a lung, wherein the method comprises setting, in the lung simulator of claim 1, the O2 concentration and the CO2 concentration of the breathing gas guided in the at least one gas loop and simulating mechanical lung movements.

19. A lung simulator for partial simulation of functions of a lung, wherein the lung simulator comprises at least one gas loop which is connected to a ventilator, the ventilator being configured to convey a breathing gas into and/or out of the at least one gas loop at least temporarily, and wherein the lung simulator further comprises
(a) at least one device for setting an O2 concentration of the breathing gas in the at least one gas loop,
(b) at least one device for setting a CO2 concentration of the breathing gas in the at least one gas loop, provided that (a) and (b) may be combined in a single device, and
(c) at least one device for simulating a mechanical lung movement,
(b) in the at least one gas loop being a CO2 admixer and being arranged in a direction of flow in the at least one gas loop after (a) and being connected to a CO2 source, CO2 being introduced into the breathing gas in the at least one gas loop by the CO2 admixer, which CO2 admixer comprises at least one valve which is connected to the at least one gas loop.

20. A lung simulator for partial simulation of functions of a lung, wherein the lung simulator comprises at least one gas loop which is connected to a ventilator, the ventilator being configured to convey a breathing gas into and/or out of the at least one gas loop at least temporarily, and wherein the lung simulator further comprises
(a) at least one device for setting an O2 concentration of the breathing gas in the at least one gas loop,
(b) at least one device for setting a CO2 concentration of the breathing gas in the at least one gas loop, provided that (a) and (b) may be combined in a single device, and
(c) at least one device for simulating a mechanical lung movement,
at least one filter being arranged in the at least one gas loop, which at least one filter is configured to filter gas constituents at least partially.

* * * * *